United States Patent
Prestwich et al.

(10) Patent No.: US 12,000,424 B2
(45) Date of Patent: Jun. 4, 2024

(54) MOTION ACTIVATED SWITCH AND METHOD

(71) Applicants: Matthew C. Prestwich, Murray, UT (US); Benjamin N. DeMann, Murray, UT (US)

(72) Inventors: Matthew C. Prestwich, Murray, UT (US); Benjamin N. DeMann, Murray, UT (US)

(*) Notice: Subject to any disclaimer, the term of this patent is extended or adjusted under 35 U.S.C. 154(b) by 0 days.

(21) Appl. No.: 16/435,037

(22) Filed: Jun. 7, 2019

(65) Prior Publication Data

US 2019/0323545 A1  Oct. 24, 2019

Related U.S. Application Data

(63) Continuation of application No. 15/187,621, filed on Jun. 20, 2016, now Pat. No. 10,316,884.

(60) Provisional application No. 62/181,343, filed on Jun. 18, 2015.

(51) Int. Cl.
| | |
|---|---|
| *G06F 3/01* | (2006.01) |
| *F16B 5/02* | (2006.01) |
| *F16B 37/06* | (2006.01) |
| *F41G 1/35* | (2006.01) |
| *F41G 11/00* | (2006.01) |

(52) U.S. Cl.
CPC .......... *F16B 37/068* (2013.01); *F16B 5/0258* (2013.01); *F41G 1/35* (2013.01); *F41G 11/00* (2013.01); *G06F 3/017* (2013.01); *F16B 5/02* (2013.01)

(58) Field of Classification Search
CPC ...................................................... G06F 3/017
See application file for complete search history.

(56) References Cited

U.S. PATENT DOCUMENTS

| | | | |
|---|---|---|---|
| 3,044,305 | A | 7/1962 | Canfield |
| 4,365,512 | A | 12/1982 | Woodruff |
| 4,601,206 | A | 7/1986 | Watson |
| 4,821,218 | A | 4/1989 | Potsch |
| 5,180,986 | A | 1/1993 | Swartz et al. |
| 5,831,164 | A | 11/1998 | Reddi et al. |
| 6,456,939 | B1 | 9/2002 | McCall et al. |
| 7,505,364 | B2 | 3/2009 | Polvani |
| 7,841,236 | B2 | 11/2010 | Tsai et al. |
| 8,276,448 | B2 | 10/2012 | Uemura |
| 8,576,168 | B2 | 11/2013 | Kabasawa et al. |
| 8,655,619 | B1 | 2/2014 | Mannas |

(Continued)

*Primary Examiner* — Scott Bauer

(57) ABSTRACT

An algorithm analyzes the motion of an object to determine if a switch needs to be activated or deactivated. Accelerometers measure forces exerted upon an object to determine orientation in pitch, roll, and yaw axes, and to determine motion of the object. When threshold conditions for these orientations and movements are measured, the method combines taking moving averages of pitch, roll, and yaw, and additionally accumulating an integral of yaw to determine if an activation or deactivation condition is met. Should an integral condition not be constantly met while the moving average conditions are being determined, the yaw integral counter resets and the whole process must begin again. This method balances most unintentional activation conditions with activation latency. Another methodology tracks the motion of a wrist flick, similar to casting a fishing line, using acceleration and deceleration parameters.

23 Claims, 15 Drawing Sheets

(56) References Cited

U.S. PATENT DOCUMENTS

| | | |
|---|---|---|
| 8,770,023 B2 | 7/2014 | Ogihara et al. |
| 2008/0262680 A1 | 10/2008 | Yeh et al. |
| 2011/0012535 A1 | 1/2011 | West et al. |
| 2012/0029300 A1* | 2/2012 | Paquet .................. G16H 40/67 |
| | | 600/300 |
| 2012/0100889 A1* | 4/2012 | Kim .................. H04M 1/72448 |
| | | 455/556.1 |
| 2012/0123226 A1* | 5/2012 | Schwenk ............... A61B 5/1118 |
| | | 600/301 |
| 2014/0258208 A1* | 9/2014 | Landers ................. G06N 5/048 |
| | | 706/52 |
| 2014/0330535 A1* | 11/2014 | Van Den Heuvel .. B66B 5/0006 |
| | | 702/141 |
| 2015/0140979 A1* | 5/2015 | Agsteiner ............. H04W 84/12 |
| | | 455/416 |
| 2016/0220176 A1* | 8/2016 | Desnerck .............. G06F 3/0362 |
| 2016/0275336 A1* | 9/2016 | Park ................... G06K 9/00335 |

\* cited by examiner

MOTION ACTIVATED SWITCH AND METHOD

CROSS-REFERENCES TO RELATED APPLICATIONS

This Application claims priority as a continuing application of prior filed U.S. application Ser. No. 15/187,612, filed Jun. 20, 2016, which in turn claims priority under 35 USC 119(e)(3) as a non-provisional perfection of prior filed U.S. Application No. 61/181,343, filed Thursday, Jun. 18, 2015. This Application incorporates both by reference herein in their entireties.

The patent or application file contains at least one drawing executed in color. Copies of this patent or patent application publication with color drawings will be provided by the Office upon request and payment of the necessary fee.

FIELD OF THE INVENTION

The present invention relates to the field of electrical switches and more particularly relates to an apparatus and method by which accidental "on" conditions (also known as "unintended activation signals") are reduced such that a switch is only activated when intended by a user.

BACKGROUND OF THE INVENTION

A person entering an armed situation has many things about which to worry. Of paramount concern is the presence, capability, and actions of an opponent as well as the person's own security and risk. All other concerns are secondary and, too often are distractions from the primary objective.

Lights and laser sights are common equipment used with firearms in tactical situations. When these devices are used with a handgun, they are usually mounted underneath the barrel as this location is least obstructive to a user's line of sight and also easily concealed in a holster without the need to remove the unit. However, locating a sighting or lighting device in this particular area of a handgun makes it inherently cumbersome to activate or deactivate. Historically these lights or laser sights have been activated by a button. However, this button can be accidentally activated by a holster, be hard to reach, and activating the device requires the extra step of pressing the button which introduces a potentially dangerous distraction in an armed situation.

Automatic switches have been developed for these devices, but these automatic switches have limitations. One version of the automatic switch requires specially equipped holsters that will activate the switch when drawing the gun. If the user does not have the required special equipment on their holster, the automatic switching feature does not work. Other types of automatic switches rely on locating a button on the grip of the gun to activate the device. However, this type of switch makes it difficult to keep a sure grip on the gun. Furthermore, these types of automatic switches tend to be unreliable. For automatic switches requiring specially equipped holsters, if the holsters do not properly switch the device when holstered, then the device will stay on in the holster which prematurely drains the battery. For devices with buttons on the grip, if the user is not able properly grab the grip with the button, then the button switch will not activate.

Motion switches exist which can automatically activate or deactivate devices by sensing inertial motion. Common applications include inertial switches that disengage a laptop computer's hard drive if the computer is dropped, as well as inertial switches that deploy an airbag in the case of a motor vehicle collision. However, these types of switches, once they are activated, are typically used to permanently change the state of the device to which they are associated. One problem with using an inertial switch to both activate and deactivate a device is the rebound effect. When an inertial switch first registers an acceleration that is above the threshold necessary to activate the switch, the rebound of the motion sensing apparatus may register an acceleration in the opposite direction large enough to cross an opposite threshold that deactivates the switch. An example of this might be trying to sense the inertial upward motion inherent in drawing a weapon vertically from a holstered position. The upward motion of the draw may register a large enough acceleration in a motion sensor to activate a laser attached to the weapon. However, as the motion sensor rebounds, the acceleration of the rebound may be large enough to cross an opposite lower bounded threshold that deactivates the laser.

Furthermore, activation or deactivation of devices by inertial switches can be complicated by motion sensors being unable to distinguish between unintended activation signals versus intended activation signals. In the example of the weapon drawn from a holster, an inertial motion sensor may not be able to distinguish the difference between a weapon being drawn vertically from a holster and a holstered weapon on a user who is rapidly ascending a set of stairs. These two activities can cause the motion sensor to register similar values, and both activities could activate the laser, but in the case of drawing the weapon, the user intends to activate the laser, but in the case of rapidly ascending a set of stairs with the gun holstered, the user does not intend to activate the laser.

The present invention is a motion activated switch for an associated electronic device and methodology for activating that switch. The switch is useful for a firearm laser sight but may be adapted to other uses. The switch utilizes algorithms which decrease unintended activation and deactivation of the switch and the associated device.

The present invention represents a departure from the prior art in that the switch of the present invention allows for more precise motion control of an electronic device.

SUMMARY OF THE INVENTION

In view of the foregoing disadvantages inherent in the known types of motion control systems, this invention provides an improved algorithm for the activation and deactivation of an electrical switch based on motion, in particular for a handgun mounted light source. As such, the present invention's general purpose is to provide a new and improved method that is effective in distinguishing between false activation and deactivation signals while maintaining reasonable responsiveness to intentional activation and deactivation motions.

To accomplish these objectives, the method comprises a Control Algorithm which measures changes in accelerations caused by the motion of an object, such as a handgun. The Control Algorithm is separated into sub-algorithms with one sub-algorithm to activate the device, called the Activation Algorithm, and another sub-algorithm to deactivate the device, called the Deactivation Algorithm. The Activation Algorithm is further sub-divided to accomplish activation in various modes. Two disclosed modes are described as "Angle-On mode" and "Cast-On mode." The Angle-On mode will activate the switch when the device is tilted past a certain angle. The Cast-On mode will activate the switch in response to a flick of the wrist. Furthermore, Angle-On mode and Cast-On mode may be combined to activate multiple switches. For example, Angle-On mode could activate a first switch, and while the first switch is activated, Cast-On mode could activate a second switch. Other modes may be further devised and developed.

The algorithms make use of the concept of a Simple Moving Average, otherwise known as a Moving Average (MA) of readings from motion sensors. A Moving Average is the sum of a series of previous readings from a motion sensor divided by the number of those previous readings.

The purpose of the MA is to smooth measured values. While the MA is effective at smoothing measured values, other statistical and mathematical methods can be used to smooth measured values. Examples include Weighted Moving Average, Exponential Moving Average, Low Pass Filter, Savitzky Golay Filter, Fourier Smoothing (using the Fourier Transform).

The Angle-On mode comprises a sub-algorithm which measures changes in accelerations caused by the motion of an object such as a handgun, takes a MA of those changes in accelerations, and compares that MA to the static acceleration caused by gravity. When certain threshold acceleration parameters are reached, the device is activated, and stays activated until the conditions of the Deactivation Algorithm are met. In addition to meeting the MA threshold, an additional requirement needs to be met to keep the device from unintended activation signals. While in the Angle-On Mode the algorithm starts a counting accumulator (called the Activation Integral Counter, or AIC) while appropriate acceleration parameters are present. If the acceleration parameters change beyond a specified range before activation, the AIC resets and the switch is not activated.

The Cast-On Mode further comprises a sub-algorithm (called the "Straight Line Algorithm" or SLA) which measures changes in accelerations caused by the motion of an object, such as a handgun, takes a MA of those changes in accelerations and detects patterns in the MA of the changes in accelerations that are caused by a user. The characteristic pattern of a "wrist flick" comprises changes in the direction of accelerations above or below certain activation thresholds, but no reversals in the direction of accelerations between the activation thresholds. By a "reversal," it is meant that there is a given vector of acceleration experienced by the switch at a given time. This vector will have a directional component that can be generally said to be "up" or "down", causing a net gain or loss on a graph of that directional component. A reversal, then, is when the next acceleration vector measured by the switch proceeds in an opposite direction from the first. Note that changes in magnitude of the direction will still not be considered a reversal unless the change reaches the point where the new value is higher or lower than the old value, in the opposite direction of the previous measurement, and a checkpoint has not been reached. When the characteristic pattern of "wrist flick" is detected in the accelerations caused by the user, the device is activated, and stays activated until the conditions of the Deactivation Algorithm are met. Using this algorithm, unintended activations are minimized since most other activities from a user (i.e. activities like walking, running, or climbing stairs) performed while wearing the object often also cause several relatively small movements in the object, which in turn causes changes in the direction of accelerations in-between the upper and lower bounded activation thresholds.

The Deactivation Algorithm takes measured changes in accelerations caused by the motion of an object, such as a handgun, takes a MA of those changes in accelerations, and compares that MA to the static acceleration caused by gravity. When certain threshold acceleration parameters are reached, the device is deactivated, and stays deactivated until the conditions of the Activation Algorithm are met. The thresholds of the Deactivation Algorithm may be different than the thresholds of the Activation Algorithm. To reduce the incidence of Unanticipated Deactivations (UD's), the algorithm starts a counting accumulator (called the Deactivation Integral Counter, or DIC) while appropriate acceleration parameters are present. If the acceleration parameters change beyond a specified range before deactivation, the DIC resets and the device remains activated.

The measurements required for the Control Algorithms are usually taken in milliseconds, so responsiveness is minimally compromised. Ideally, accelerations are measured about 3 axes.

The more important features of the invention have thus been outlined in order that the more detailed description that follows may be better appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

With reference now to the drawings, the preferred embodiment of the switch and method are herein described. It should be noted that the articles "a," "an," and "the," as used in this specification include plural referents unless the context clearly dictates otherwise.

Figure 1:
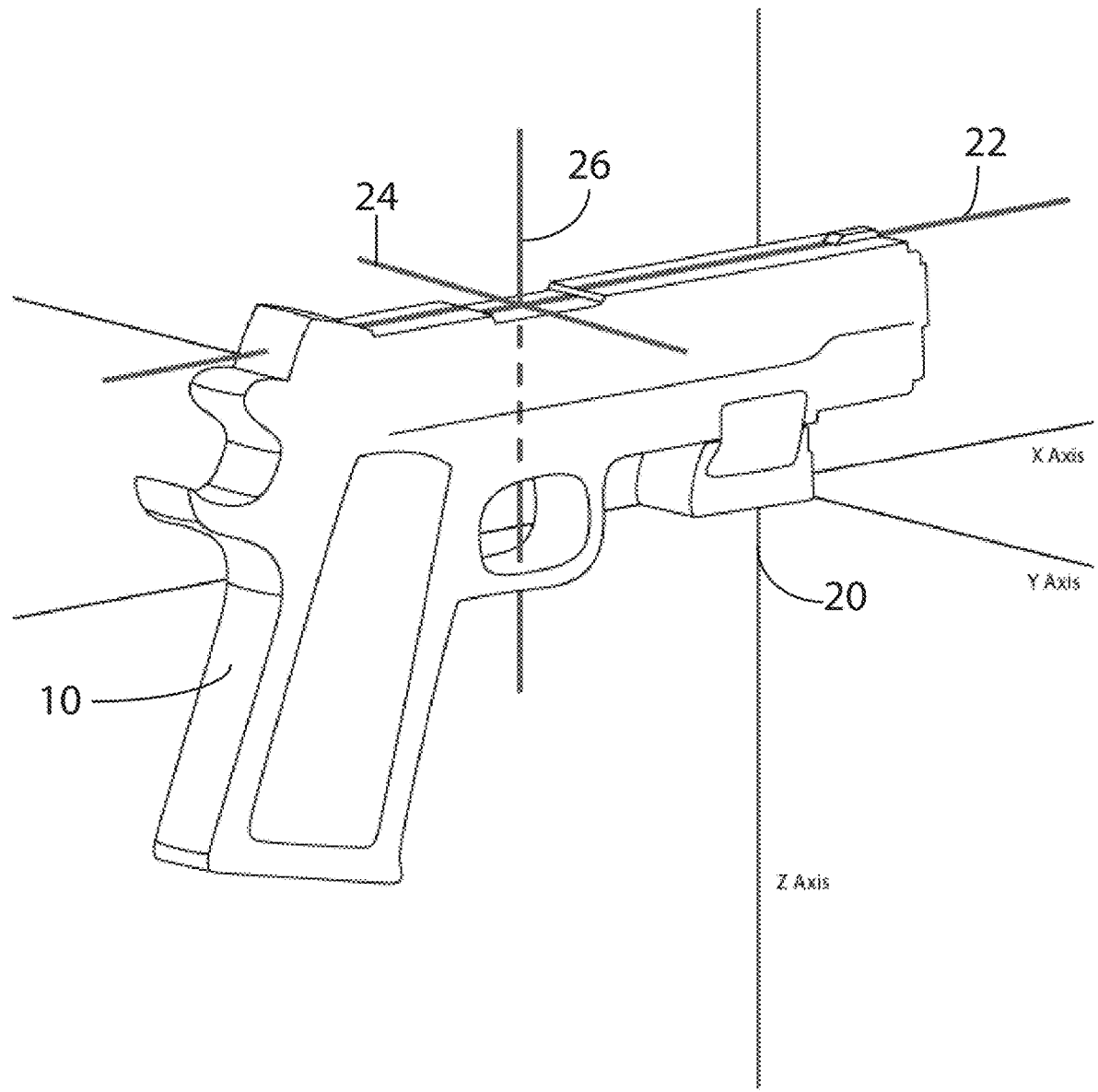
FIG. 1 is a schematic drawing depicting three major axes for a handgun in a drawn position.

Accelerometers are utilized to measure the orientation of the object, such as the depicted handgun and associated laser device, in relation to the ground. FIG. 1 shows how the different axes 20 in coordinate space work in relation to the axes of the gun and attached laser device. In FIG. 1 the gun and attached device 10 is in a drawn position. The red pitch axis 22 and the blue roll axis 24 on the gun are parallel to the ground and the green yaw axis 26 on the gun is perpendicular to the ground. If any axis on the gun is parallel to the ground (neutral), and the gun is not in motion then the reading from the accelerometer for that axis is 0 g. If any axis on the gun is perpendicular to the ground, and the gun is not in motion, then that axis will have a reading of 1 g or negative 1 g depending on the orientation of the gun. In FIG. 1 the top of the gun is pointing up, making the green (yaw) axis 26 perpendicular to the ground so the value of the yaw is 1 g. When the gun is inverted the yaw reads −1 g. When the gun is at an angle, the accelerometer reading (A) will be between 1 g and −1 g, with 0 g a neutral reading, and from that reading we can determine the angle (θ) using the formula:

$$\theta = \arcsin(A)$$

Figure 2:
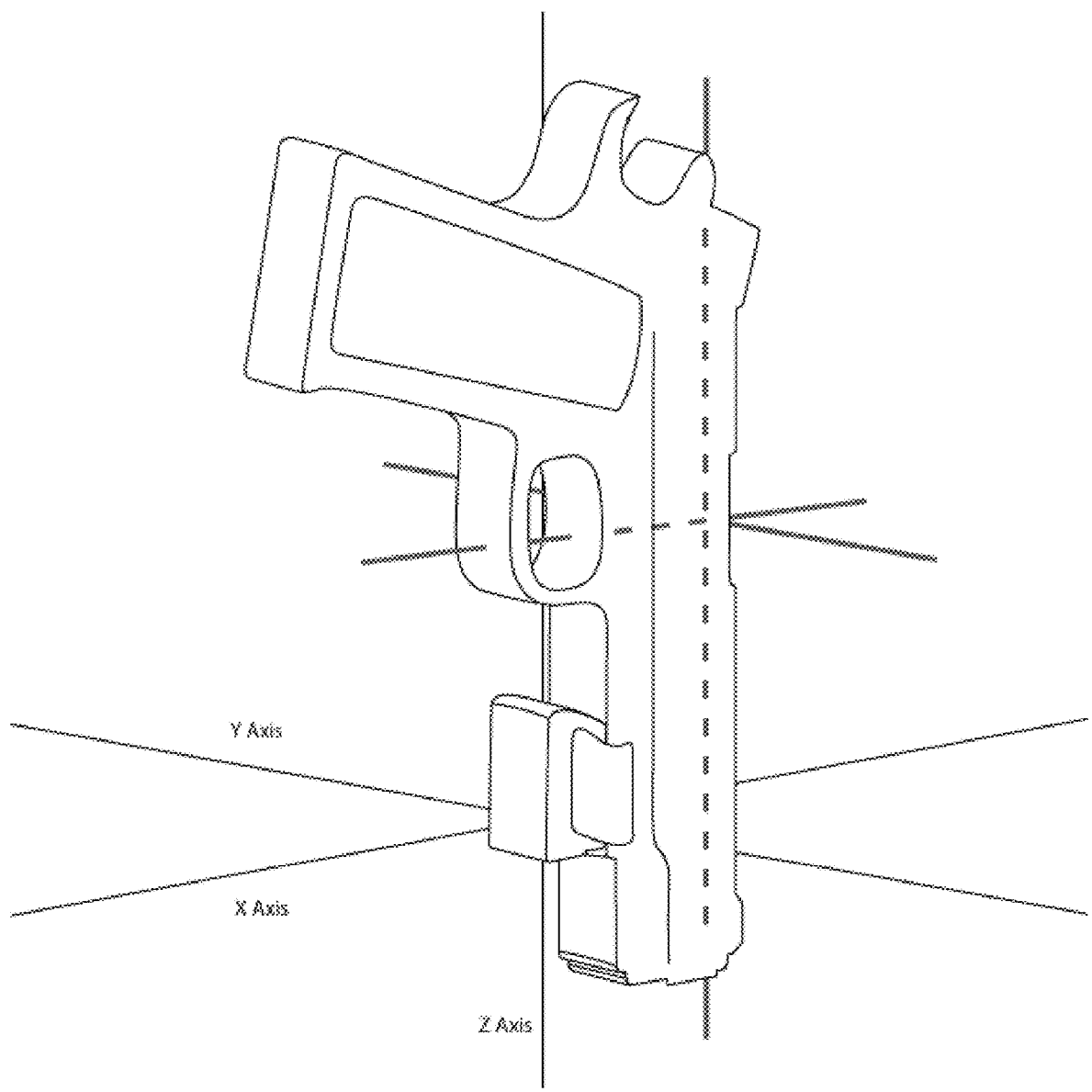
FIG. 2 is a schematic drawing depicting three major axes for a handgun in a holstered position.
Figure 3:
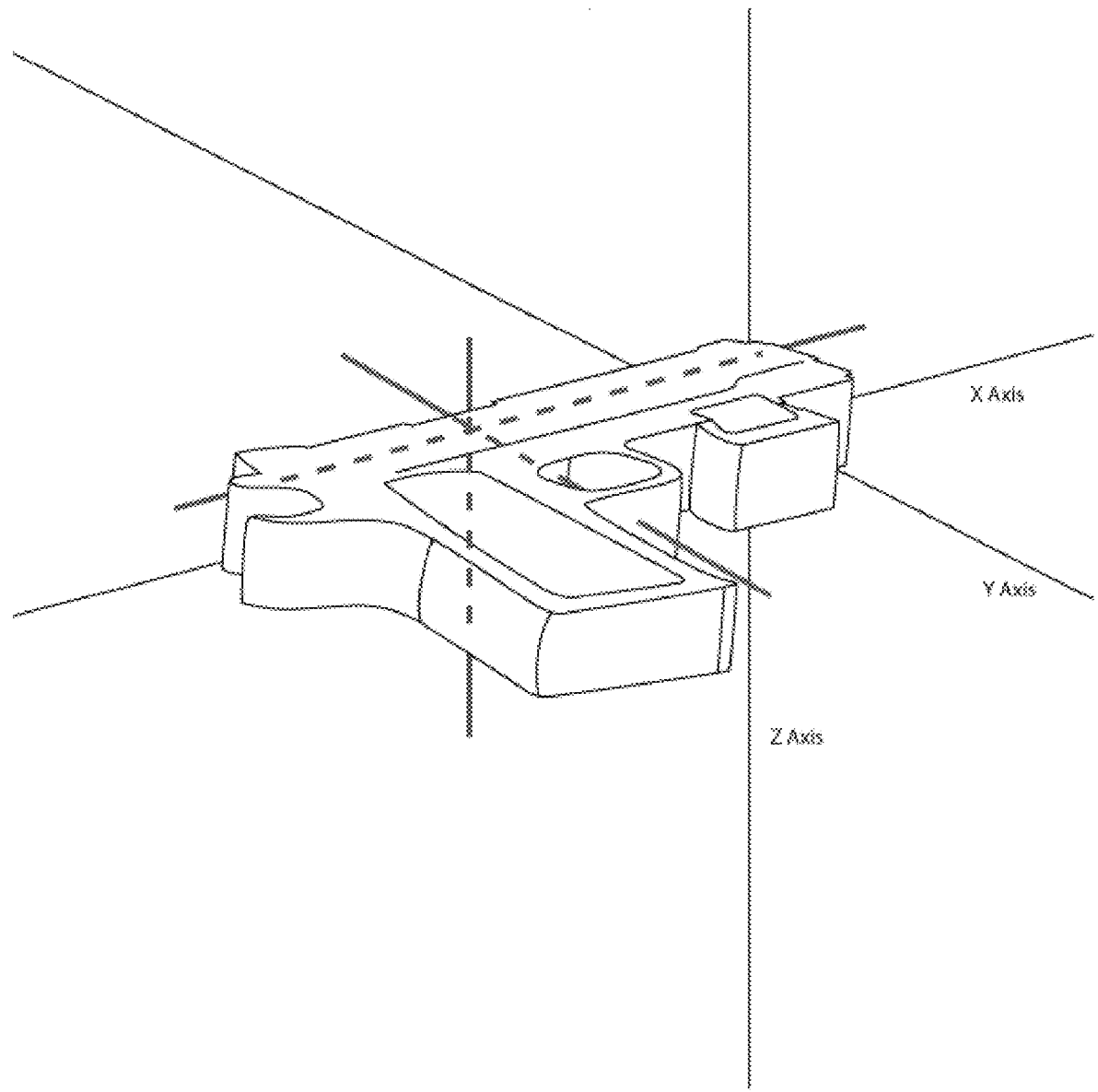
FIG. 3 is a schematic drawing depicting three major axes of a handgun lying on its side.
Figure 4:
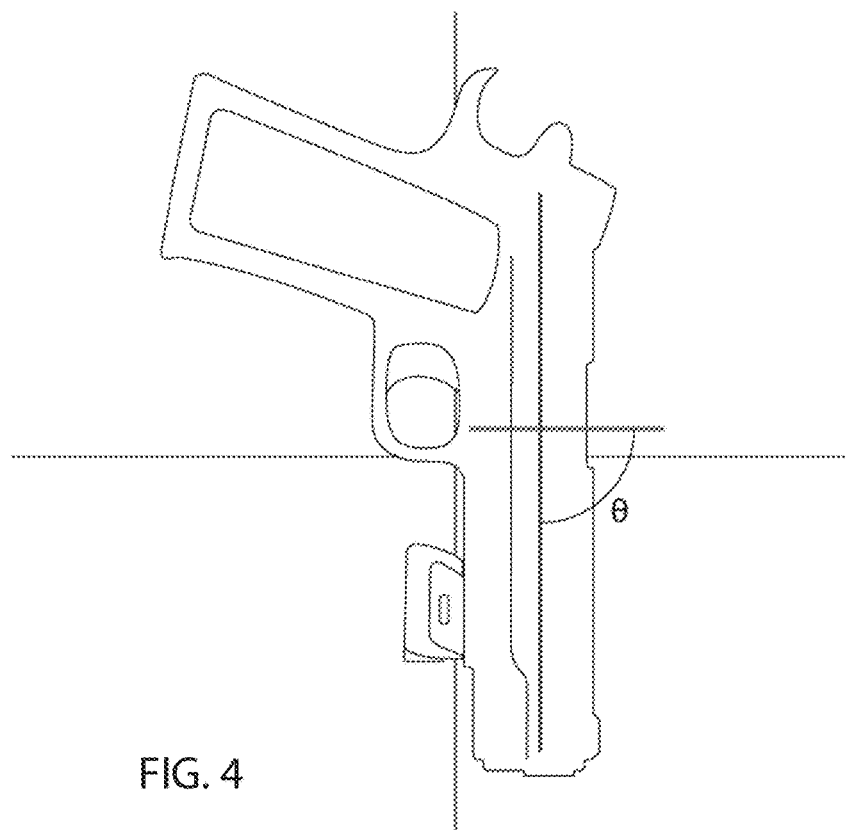
FIG. 4 is a schematic drawing depicting the pitch angle θ in a holstered gun.

In FIGS. 2 and 3 respectively the gun and attached device is shown pointed down (holstered) and laid on its side. In FIG. 2 the value of the yaw 26 (green axis on gun) and the roll 24 (blue axis on gun) are both 0 g and the pitch 22 (red axis on gun) reading is at −1 g. If the gun in FIG. 2 was inverted so that it was pointing upward then the reading for the pitch would be 1 g.

In FIG. 3 both the yaw 26 and pitch 22 read 0 g and the roll 24 reads 1 g, or −1 g if it were laying on its other side. It should be noted that the positive, negative, and absolute values assigned are arbitrary and may be reversed or otherwise altered with simple adjustment to the programming of the switch and no appreciable difference in performance.

Moving Average

The accelerometer measures static acceleration caused by gravity, which can be used to determine the orientation of the gun and the attached device relative to the ground. The accelerometer also measures accelerations due to movement of the gun and the attached device. Often times the accelerations measured while the device is in motion can be erratic. Taking a Moving Average (MA) can help smooth out the measured values from the accelerometer which adds predictability to the algorithm.

The MA is calculated by taking the sum of a series of previous readings from the accelerometer and dividing that sum by the number of previous readings. Readings are taken from the accelerometer at a suitable interval. For this Specification, 20 millisecond intervals are used; however, any amount of time could be used for the interval, depending on the desired responsiveness. Additionally, other non-time-based methods for determining an interval could be used, for example the number of cycles or sub-cycles of an algorithmic process. To calculate what is termed a "5 MA," at the end of an interval, the previous 5 readings from the accelerometer would be added together and divided by 5. The resulting value would then be used by the algorithm. At the next interval, the process repeats. The process repeats at every interval so that the value used by the algorithm is the average of the previous 5 readings from the accelerometer. Other statistical methods could also be used to smooth out, or otherwise normalize the measured values from the accelerometer. Examples include but are not limited to Weighted Moving Average, Exponential Moving Average, Low Pass Filter, Savitzky Golay Filter, Fourier Smoothing (using a Fourier Transform).

Once the MA's are calculated, these MA's can be used to determine the position and motion of the object, which can then be used to activate or deactivate a switch.

Different sample sizes and intervals may be used to calculate the MA. The greater number of samples used to calculate the MA, the more the data can be smoothed. The fewer number of samples used to calculate the MA, the closer the MA values will be to the raw values measured directly from the accelerometer. For example, a 2 MA would output values almost the same as the raw values measured from the accelerometer whereas a 50 MA would output data that has been greatly smoothed. However, the greater the number of samples used to calculate the MA, the more latency there is in detecting changes in the motion or position of the gun and attached device. The fewer number of samples used to calculate the moving average, the greater likelihood of unintended activation signals.

In the preferred embodiment, it was found that a 3 MA for a 20 ms interval provided an adequate balance, in the inventors' opinion, between representing the movements of the accelerometer (the "signal" from the accelerometer) while filtering out irrelevant small reversals of the accelerometer (the "noise" from the accelerometer). It is to be readily understood that many concerns will be utilized in determining the best mode in a given situation. These concerns include preference of the designer for balancing latency versus accuracy and hardware efficiency, including battery life. The invention should, by no means, be interpreted to be merely the stated preference of these interval and average values.

A 50 MA at 10 ms intervals was attempted to smooth the data, and while this did provide a significant amount of smoothing, it also caused appreciable latency in detecting changes in position of the device. Since it takes fifty 10 ms intervals for the 50 MA to "catch up" to the new position of the device, then there can be as much as a ½ second delay or longer in detecting a change in the position of the device.

For instances where the 50 MA caused too much latency, a 20 MA at 10 ms intervals was tried. However, the 20 MA was also found to have appreciable latency. It was finally determined that using a 3 MA on 20 ms intervals provided an adequate balance between an acceptable amount of smoothing of the data, while minimizing latency as much as possible. Using a 20 ms interval instead of a 10 ms interval also increases battery life while not causing noticeable latency. It should be noted that the decision to use a 3 MA on 20 ms intervals is optimized for the desired performance of the preferred embodiment, and this preferred embodiment is used as merely an illustrative embodiment of the invention in this Specification. It should be remembered that greater or fewer numbers of samples may be used to calculate Moving Averages, and larger or smaller intervals may be used depending on the desired performance of the switch.

Activating the Device—Angle-on Mode

Figure 5:
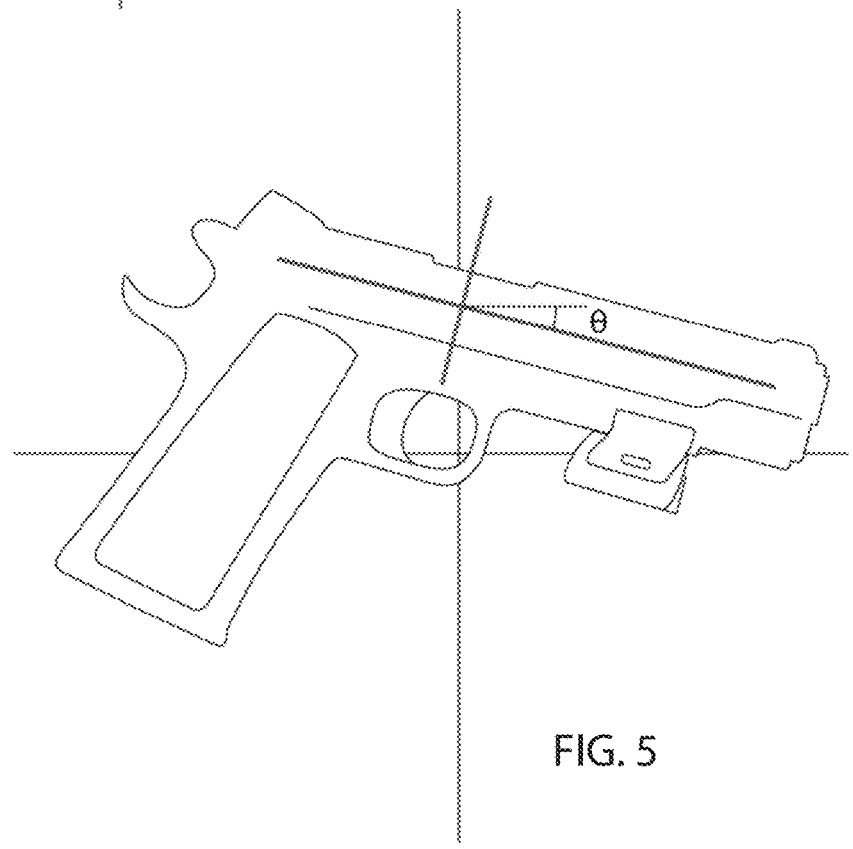
FIG. 5 is a schematic drawing depicting a gun drawn to the activation threshold pitch angle θ.
Figure 6:
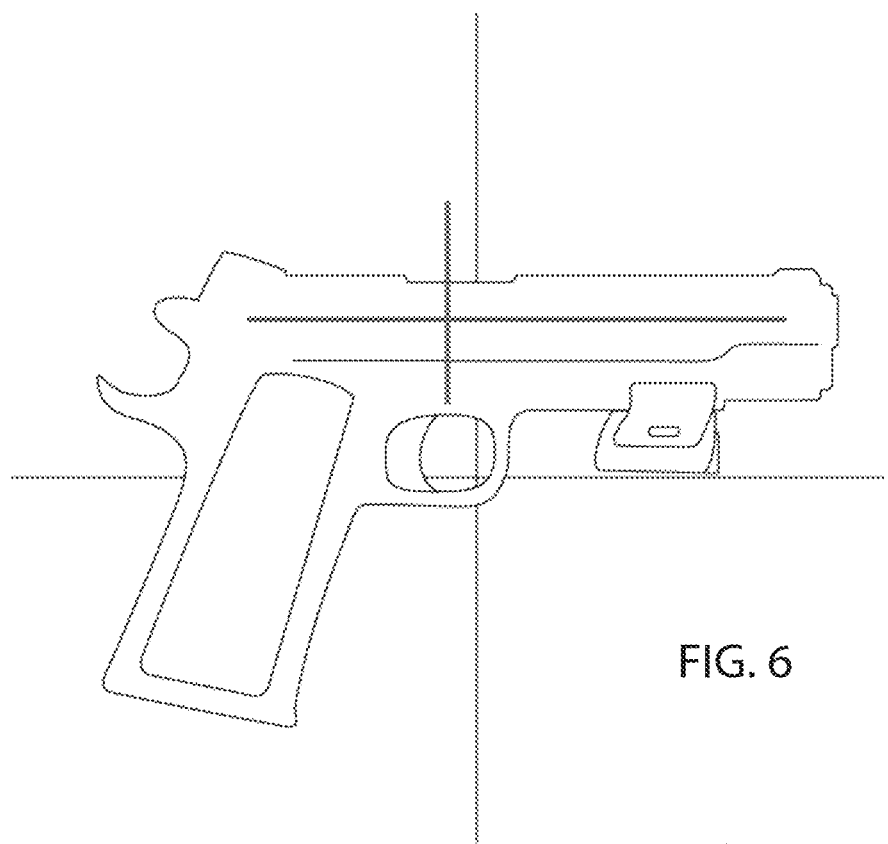
FIG. 6 is a schematic drawing depicting a fully drawn gun.
Figure 7:
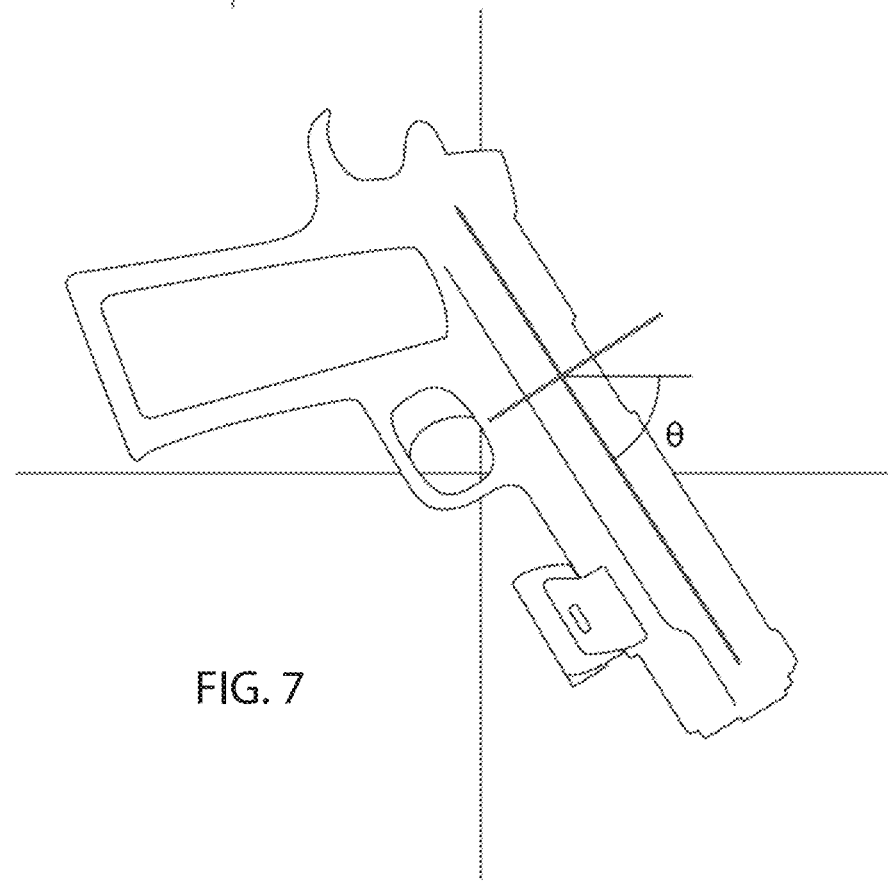
FIG. 7 is a schematic drawing depicting a gun drawn to the deactivation threshold pitch angle θ.

One algorithm used to activate the switch is termed "Angle-On Mode." Angle-On Mode has three conditions that need to be met to activate the switch of the device. The first condition is the MA of the pitch angle θ needs to be above a certain threshold. In the preferred embodiment −14.5° from the horizontal was chosen (FIG. 5), which approximately corresponds to a MA pitch accelerometer reading of −0.25 g. The second condition is the MA of the roll angle σ needs to be between within certain thresholds. In the preferred embodiment the angles −48.6° and 48.6° (FIGS. 10 and 12 respectively) were chosen, which approximately corresponds to a roll accelerometer reading of +0.75 g and −0.75 g. The third condition is an Activation Integral Counter (AIC) needs to be above a certain threshold; in the preferred embodiment 0.046 s·g was used. The three conditions that need to be met will now be discussed in more detail.

Angle-on Mode: Pitch Angle

One of the problems with using measurements from a motion sensor to activate a switch is that it is difficult for the motion sensor to distinguish the difference between an intended activation signal (IAS) and an unintended activation signal (UAS). For example, as explained earlier, an accelerometer reading of the pitch axis (red) of −1 g corresponds to the device being in a vertical position (i.e. the device is holstered) and a accelerometer reading of the pitch axis of 0 g corresponds to the device being in a horizontal position (i.e. the device is drawn from a holster to a horizontal position). An algorithm could easily be devised that would specify that if a pitch reading is −1 g, the device must be vertical (i.e. holstered), therefore keep the device switched off and if a pitch reading is 0 g or above, the device must be horizontal (i.e. the device must be drawn) therefore activate the device. However, an accelerometer not only measures static acceleration due to the force of gravity, it is also measures acceleration due to motion. Motion from everyday activities like walking, running, or climbing stairs may also often cause the accelerometer to measure accelerations above or below the thresholds that will activate or deactivate the device. Depending on the value of the activation or deactivation thresholds the forces generated by walking with a holstered gun may cause the device to be activated and deactivated with every step. This would not be desirable because all these unintended activations (UA's) would prematurely drain the battery of the device.

Taking a MA is one way to distinguish between static forces and those accelerations caused by motion. An interval of time ("t"), usually between 5 and 50 ms, is selected and a set number of measurements ("x") are made, usually between 2 and 10. Then, after x measurements are made in t intervals, the measurements are averaged. When another measurement is made, the first measurement in the set is dropped and the remaining measurements are averaged again, and so on. By increasing the number of samples used to calculate the MA, it smooths out the data which helps to determine the difference between activity like walking and activity like drawing the gun. The higher the number of samples used to calculate the MA, the more the data can be smoothed; but, with fewer samples to calculate the MA the device could still have UA's with every step. By using more samples, it would typically be possible to detect the difference between activity like walking, and activity like drawing the device from a holster to a horizontal position. As an example, most walking activity occurs when the device is holstered, so the MA of the pitch centers around −1 g, with variations typically being small enough not to cross the threshold which activates the switch. With a draw to a horizontal position, the MA would be centered around 0 g, again with variations from 0 g being typically small enough not to deactivate the device.

It is important to determine the optimum angles to activate the device. In the case of the pitch angle θ, if the angle is too steep, then the device might not be able to detect the difference between the IAS of drawing the gun and attached device to a horizontal position, and an UAS like reclining back in an office chair. However, if the angle is too shallow, then the user would have to raise the device unnaturally high to intentionally activate the device. Using an activation pitch angle θ of −14.5° (approximately corresponding to an accelerometer reading of −0.25 g) is a good compromise, putting the pitch activation angle shallow enough that activities like reclining in a typical office chair will usually not activate the device, but raising the device to horizontal, or a little bit below (i.e. drawing the gun and attached device), will activate the device since at horizontal the pitch angle of the device will average around 0 g, which is above the −0.25 g activation threshold. While it was determined that a pitch activation angle approximately corresponding to −0.25 g was optimum, any pitch activation angle could be used, including a pitch activation angle configurable by the user.

While using greater numbers of samples to calculate MAs is fairly effective at determining the difference between gentle motion like walking with the device holstered, and drawing the device to a horizontal position, it was found that increased activity like brisk walking, jogging, ascending and descending stairs, etc. with the device holstered could cause MA's of the pitch angle to cross the activation threshold resulting in UAS's. For example, brisk walking with the device holstered often causes the 20 MA of the pitch on 10 ms intervals to cross the −0.25 g activation threshold and even a 50 MA of pitch on 10 ms intervals can cross the −0.25 g threshold during very brisk walking, jogging, or ascending or descending stairs with the device holstered. Ultimately it was determined that using MA, (as well as other statistical methods) as the sole determinant of activity and position while wearing the device was problematic at moderate to high activity levels. Using the MA is most effective when determining the position of the device when the device is not in motion (i.e. when the user is standing or sitting). However, using the MA alone during increased activity resulted in an appreciable number of UAS of the holstered device. The only way to correct this, using the MA alone, was to take a much greater number of samples, but this introduced a latency the inventors found to be unacceptable.

Angle-on Mode: Activation Integral Counter—Yaw Axis

Since depending on MA alone results in increased instances of UAS's at increased activity levels, and since trying to minimize UAS's by taking a greater number of samples to calculate the MA causes increased latency, the inventors developed an additional "integral" algorithm to mitigate UAS's while simultaneously allowing the increased responsiveness of using fewer samples. This algorithm is called the Activation Integral Counter (AIC). The AIC is essentially a counter that is required to add up to a certain value before the device will activate.

In the preferred embodiment the AIC uses measurements of the 3 MA on 20 ms intervals of the yaw axis, however, any MA could be used for the AIC (with greater numbers of samples in calculating the Moving Averages introducing more latency). Since in the preferred embodiment the yaw axis is being used, the counter is called the Activation Integral Counter-Yaw Axis, or AIC-Yaw Axis. Referencing FIG. 8, the basic idea is that when the yaw value goes above 0 g (the yaw axis 26 being parallel to the ground), then the AIC algorithm adds up the area between the yaw value and the 0 g line (this area is the "yaw integral") and stores this value in the AIC-Yaw Axis. As long as the yaw is positive, every 20 ms it checks the yaw value, multiplies it by 20 ms (0.02 seconds), and adds the result to the current value of the AIC-Yaw Axis, thus incrementing the value of the AIC-Yaw Axis every 20 ms. It could be said that the AIC-Yaw Axis is a running tally of the area between the green yaw axis line and the 0 g line in FIG. 8. If the AIC-Yaw Axis reaches a certain threshold value, then it meets the pre-set condition. If the yaw value goes negative (below the 0 g line) before the threshold value is met, then the AIC-Yaw Axis is reset (i.e. set to 0 s·g). It stays at a 0 value until the next time the yaw goes positive again. "Clearing the Integral" is the term chosen to name the process of setting the AIC-Yaw Axis value to 0 s·g. If the AIC-Yaw Axis reaches the pre-set activation threshold value before it clears, then the device is most likely in a drawn position and the switch may be turned on.

Other methods of resetting or reducing the AIC-Yaw Integral are possible. For instance, the average of the AIC-Yaw integral may be tracked, such that a drop in the Yaw Integral below 0 s·g would merely reduce the AIC-Yaw Axis by a corresponding value, with a positive value resuming an increase in the AIC.

The AIC can detect the difference effectively between activities like walking while wearing the holstered device and drawing the device to a horizontal position. In addition, the AIC is effective in determining the difference between more vigorous activity (i.e. brisk walking, jogging, or stairs while wearing the holstered device) and drawing the device. It is effective because walking, jogging, and stairs result in numerous instances of crossing the 0 g yaw threshold, which causes the AIC-Yaw Axis to clear often and never add up to the activation threshold. However, if the device is drawn to a horizontal position then the AIC-Yaw Axis will rapidly add up, thus meeting the activation threshold condition and thus turning the switch on and activating the device.

Figure 8:
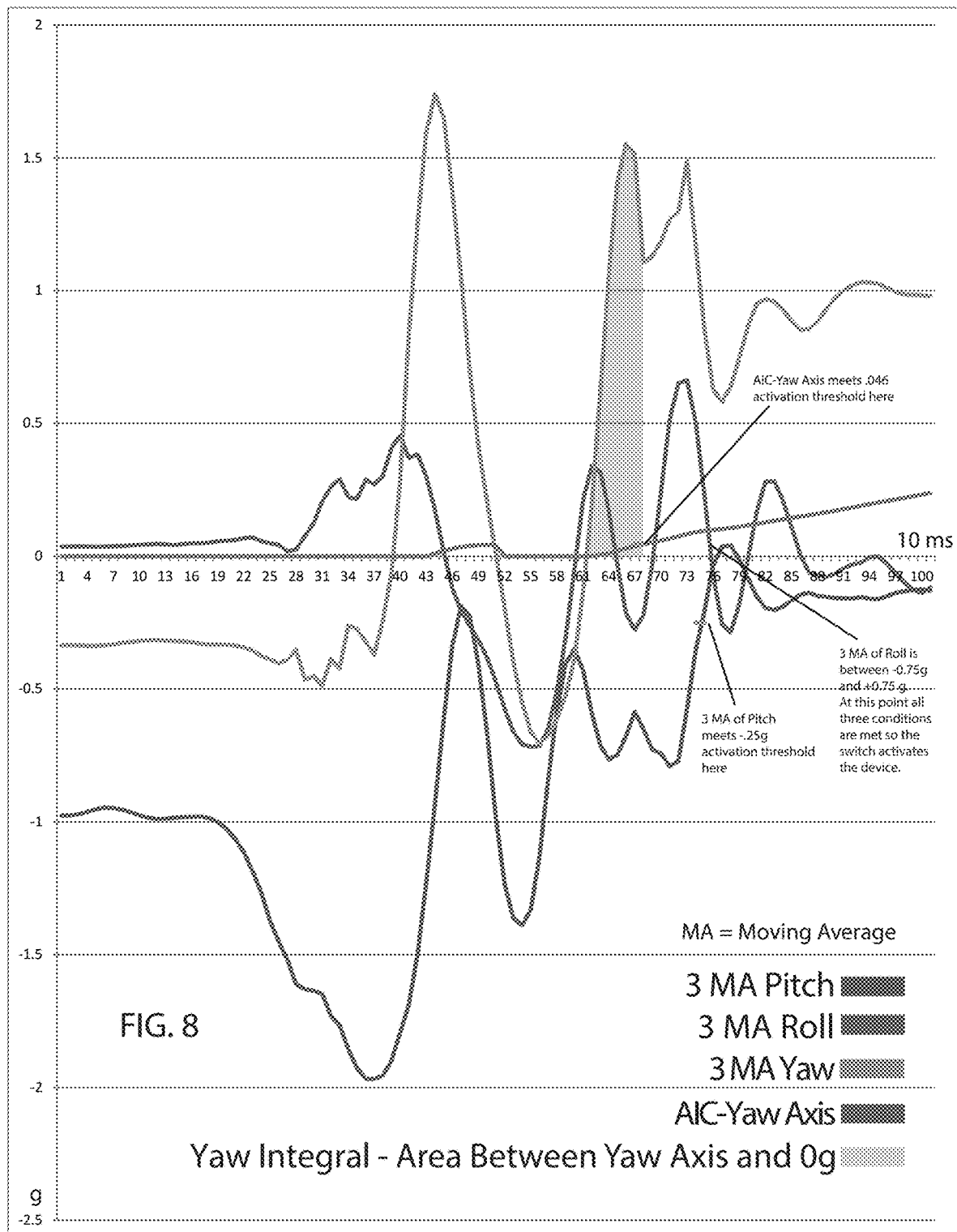
FIG. 8 is a graph illustrating the Angle-On method and the calculation of target thresholds.
Figure 9:
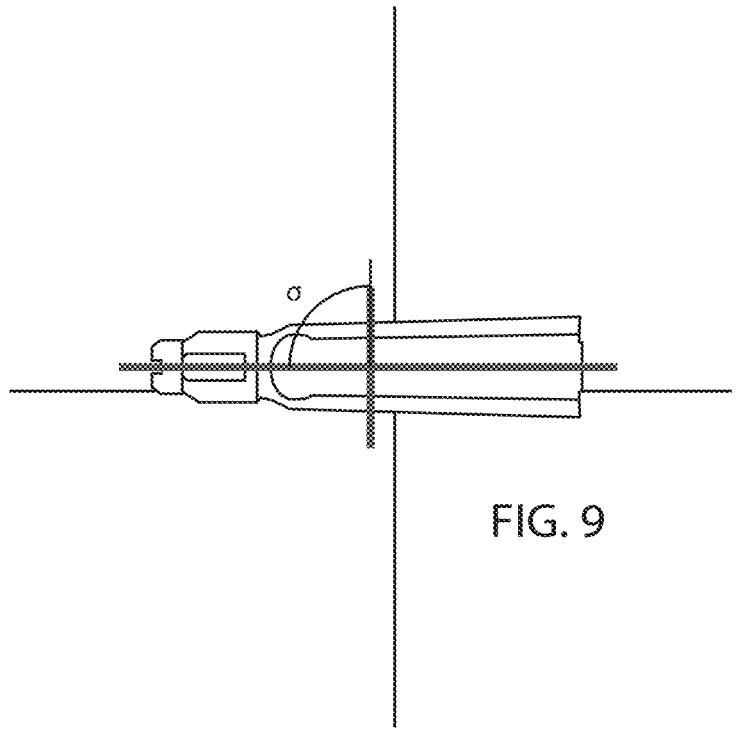
FIG. 9 is a schematic drawing depicting the roll angle σ in a gun lying on its side.

When the device is holstered the reading of the yaw axis is typically about 0 g. FIG. 8 depicts a graphical representation of the data recorded when drawing the device from a more or less vertical holstered position to a more or less horizontal drawn position. FIG. 8 depicts a graph of the 3 MA of the yaw axis (green), which is hovering just below 0 g at the left of FIG. 8. Also, in FIG. 8, the Yaw Integral is represented by the grayed-out section of the graph. In other words, the grayed-out section represents the area between the 3 MA of the yaw axis and the 0 g line. The line labeled AIC-Yaw Axis is the plot of the AIC-Yaw Axis as it increases over time.

As the device is raised to the horizontal position (the process of drawing the gun and attached device) the yaw axis starts to increase. The closer the yaw reading gets to 1 g (the position typically found when the device is drawn to horizontal), the faster the AIC-Yaw Axis reaches the required activation threshold value, and thus the device is able to activate more quickly.

Moving from the left of FIG. 8 to the right, the yaw value starts to increase rapidly at about 370 ms (37 on the horizontal axis) due to the motion of drawing the device to horizontal. It crosses 0 g at about 390 ms, and eventually goes above 1.5 g at about 430 ms. Also at about 430 ms the AIC-Yaw Axis starts incrementing (note: there is an additional condition, discussed below where the 3 MA of the pitch axis is required to be above −1 g in order for the AIC-Yaw Integral to begin incrementing, which is the reason the AIC-Yaw Integral does not begin incrementing at about 390 ms, but instead begins incrementing at about 430 ms). Because the accelerometer rebounds so strongly at about 450 ms due to the force of the drawing motion, at about 510 ms the value of the yaw axis goes back below 0 g, thus clearing the AIC-Yaw Axis (in FIG. 8 the AIC-Yaw Axis graph goes to 0 s·g). However, since the device is drawn to horizontal, the yaw axis quickly rebounds again off the bottom at about 560 ms and starts increasing rapidly, going back above 0 g at about 610 ms. Since the yaw axis value is above 0 g (and the additional condition of the pitch axis value is above −1 g) then at about 610 ms the AIC-Yaw Axis begins incrementing again. Since the device is now fully drawn to horizontal, the value of the yaw axis stays above 0 g all the way to the right side of FIG. 8, which allows the AIC-Yaw Axis to add up to the required threshold value and allows activation of the device (as long as the MA parameters are also met).

The yaw axis is chosen as the axis used for the AIC in the preferred embodiment; however, other axes could also be used for the AIC. Furthermore, it is not necessary to use an integral for the counter. Any counter could be used if it started incrementing when the value for the chosen axis increased above a threshold, and then activated the device when the counter reached an activation threshold and that counter also cleared, or merely decremented, when the value for the chosen axis went below the threshold necessary to start incrementing the counter. The advantages of using an integral for the counter are:

1. It is a natural counter, something the measured values of the accelerometer on the device are already detecting, so there is no need for an arbitrary counter, and
2. It is a variable counter. Using the yaw axis in the preferred embodiment as an example, when drawing the device to a horizontal position, the distance between the yaw axis and the 0 g line is relatively large, allowing the counter to increase rapidly; but, when walking with the device holstered it never gets relatively large before clearing. So, using the integral of an axis allows the counter to increase faster when it should be increasing faster (i.e. when drawing the device), but keeps it small when it should not be increasing rapidly (i.e. walking, running, stairs while holstered, etc.).

There is one problem with using the yaw axis for the AIC. Some holstering options (i.e. canted while wearing in the middle of the back) can cause the yaw axis to always be above 0 g. When this happens, even if the yaw axis value stays slightly above 0 g, but never crosses below 0 g, then the AIC-Yaw Integral will slowly add up and never clear because there are no 0 g crossings of yaw axis values. To enable the AIC-Yaw Axis to clear when walking with a canted holster, an additional pitch axis parameter is used. If the pitch axis 22 crosses −1 g, this may also clear the AIC-Yaw Integral. This additional parameter is effective in differentiating between drawing the device to horizontal and canted holstered positions while the user is active because a canted holster position usually exceeds or is very close to having a pitch axis value of −1 g, so movement clears the AIC-Yaw Integral often when walking, running, or doing stairs, (because there are numerous −1 g crossings of the pitch axis values while performing these activities). However, on a draw the pitch axis value goes to 0 g (because the pitch axis is now parallel to the ground) and keeps AIC-Yaw Integral from clearing.

So, in summary, the AIC-Yaw Integral begins incrementing when the yaw axis value goes above 0 g, and it clears when either the yaw axis value goes below 0 g, or the pitch axis value goes below −1 g. If the AIC-Yaw Axis reaches its activation threshold value before it clears, then the switch on the device is allowed to be activated.

In the preferred embodiment, an AIC-Yaw Axis threshold value of 0.046 s·g was chosen; however, other AIC-yaw axis threshold values could be chosen, including an AIC-Yaw Axis threshold value programmable by the user.

Angle-on Mode: Combining Moving Average and Activation Integral Counter-Yaw Axis The AIC-Yaw Axis could be used as the sole activation signal, but one problem with using the AIC-Yaw Axis as the sole activation signal is that the value of the yaw axis may be slightly above 0 g while the user is sitting with the device in a holster that is canted forward, causing the AIC-Yaw Axis to start incrementing. Even a holster that is slightly canted forward will, over time cause the AIC-Yaw Axis to add up to the activation threshold thus causing an UAS while the user is sitting with the device holstered. Since using the MA of the pitch axis is effective at detecting the position of the device when there is little or no motion of the device (including when the user is sitting), and drawing the device to a horizontal position; and since the AIC-Yaw Axis is effective at detecting differences between increased motion of the device and drawing the device (i.e. walking or running); it was determined that by combining both the MA of the pitch axis reaching its activation threshold with the AIC-Yaw Axis reaching its activation threshold, the device could be effective at detecting the differences between static situations (i.e. sitting or standing), gentle motion (like walking), active motion (brisk walking, running, stairs, etc.), and drawing the device to a horizontal position.

While the number of samples comprising the MA, sampling intervals, activation threshold values, and axes used in the preferred embodiment result in what the inventors believe is optimum performance of the device, others may disagree with what is optimum or desired performance. Therefore, different numbers of samples for calculating MA's (including a 1 MA, which is the raw accelerometer data), sampling intervals, activation threshold values, and axes could be used. Customer programmability, including by using a smartphone application and some form of connectivity, such as BLUETOOTH communications, may also be introduced to the algorithms without departing from the spirit and scope of this invention.

Angle-on: Roll Rotation

Despite a current popularly depicted but inherently dangerous practice, it is not ideal to use a gun oriented on its side. The algorithm has built in the assumption that if the gun and attached device is laid on its side, it is not in use. To accomplish this, values of an MA (such as a 3 MA at 20 ms intervals) of the roll axis (blue) are required to be in-between certain values to activate the device. In the preferred embodiment the MA of the roll axis must be in-between the values of −0.75 g and 0.75 g, which correspond to angles σ of −48.6° and +48.6°, however other values could be used.

Figure 10:
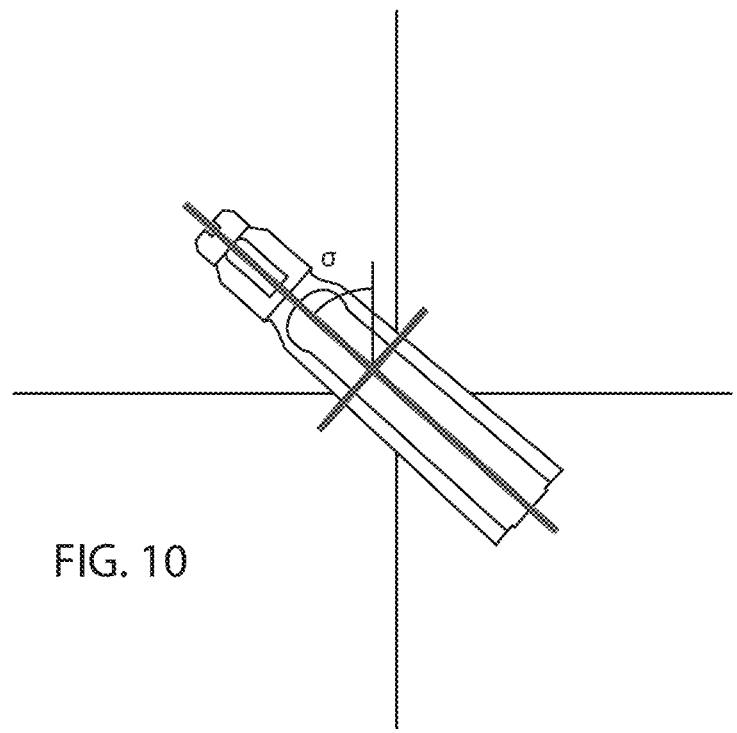
FIG. 10 is a schematic drawing depicting a gun at the Activation/Deactivation threshold left roll angle σ.
Figure 11:
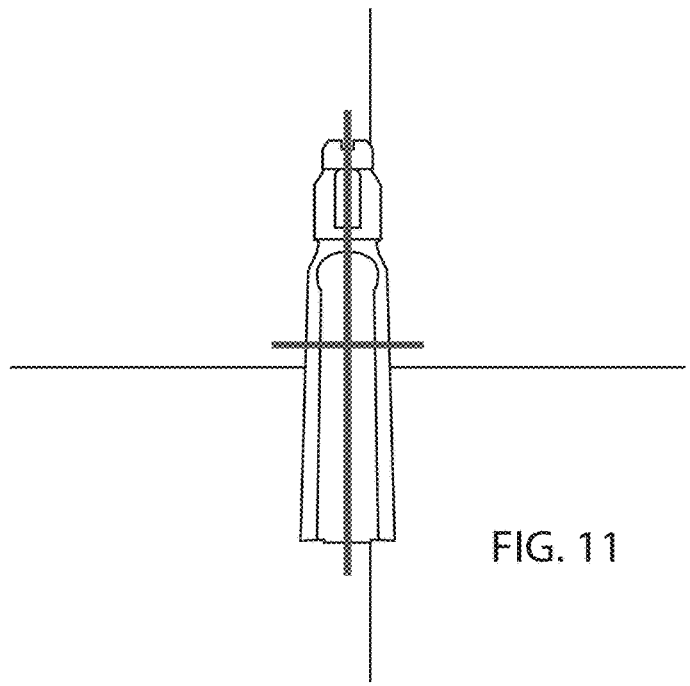
FIG. 11 is a schematic drawing depicting a fully upright gun.
Figure 12:
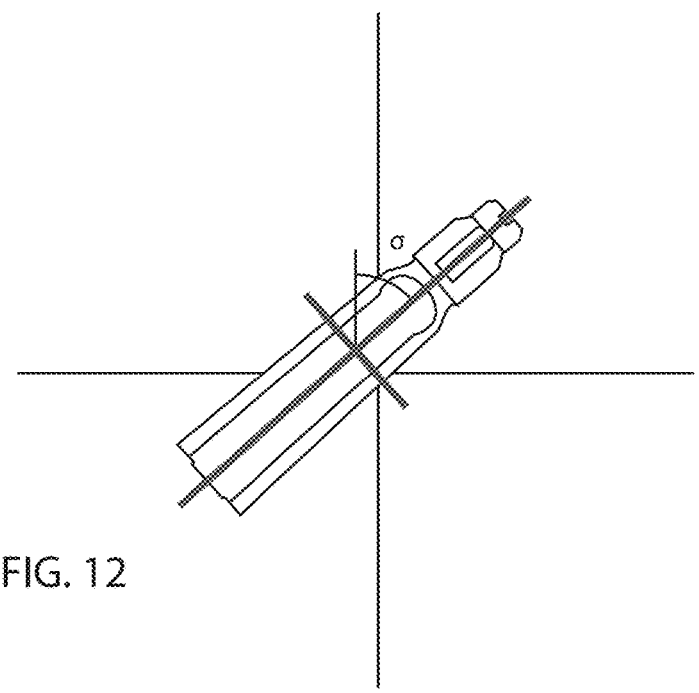
FIG. 12 is a schematic drawing depicting a gun at the Activation/Deactivation threshold right roll angle σ.

There are fewer requirements for activating the device with roll rotation because there is relatively little motion measured on the roll axis during walking with the device holstered, or other non-drawing motions. A simple 3 MA of the measurement of the angle is enough to accurately determine the roll position of the device and activate the device if it is in between the specified threshold values. This is demonstrated in FIGS. 9-12, with FIGS. 10 and 12 showing the roll activation threshold angles σ.

Below is a summary of the Angle-On mode of the Activation Algorithm in the preferred embodiment:
  Check if the 3 MA (using 20 ms intervals) of the pitch is above −14.5° (relative to horizontal).
  Check if the Activation Integral Counter-Yaw Axis value is above 0.046 s·g.
  Check if the 3 MA (using 20 ms intervals) of the roll axis is between −48.6° and 48.6°.

If all of the above conditions are met, activate the device.

Activating the Device—Cast-on Mode

A second control methodology activates the switch with a flick of the user's wrist. The term chosen to name this method is "Cast Mode" or "Cast-On Mode" as it mimics the casting of a fishing line. Cast-On Mode allows the user to activate the device manually instead of automatically when the device is drawn from a holstered position. It relies on the unique acceleration readings caused by a user "flicking their wrist." The characteristic pattern of accelerometer readings caused by a "wrist flick" are predictable and checkpoints can be set in the algorithm with maximum and minimum activation thresholds to detect the casting motion and activate the device.

While the casting motion typically causes accelerometer readings to move above and below maximum and minimum activation threshold values, other activities like walking, running, ascending or descending stairs, etc. while the device is holstered may also cause maximum and minimum activation threshold values to be crossed resulting in UAS's. To mitigate UAS's resulting from activity performed by the user when the device is holstered, a Straight Line Algorithm (SLA) was developed. When a user flicks their wrist with the device in their hand, the accelerometer readings from the motion typically proceed from their maximum activation threshold values to their minimum activation threshold values with no reversals in the direction of the accelerometer readings between these maximum and minimum threshold values. Note that at any given point of time there is an acceleration vector with a value and direction. As the vector's value continues to either increase or decrease, based on values at that given point in time and prior points (thus defining a direction), until a threshold is met, the SLA would be met. By a "reversal" it is meant that, if a value was either lower when the values are expected to increase, or vice versa, then the SLA would fail. It could be said that a graph of the accelerometer readings for the casting motion proceeds in a "straight line" between maximum and minimum activation threshold values. It should be noted that the only concern is the continued increase or decrease in the value until the threshold is met. A change in value that is along the same direction, even if the magnitude of the value is not the same, will still satisfy the SLA.

However, while activities like walking, running, or going up and down stairs, etc. performed while the user is wearing the holstered device may also cause accelerometer readings to cross maximum and minimum activation threshold values, the nature of the motion of the device while performing these types of activities may additionally cause other relatively small movements in the device in-between the maximum and minimum activation threshold values. These relatively small movements in turn cause small reversals in the direction of accelerations in-between the upper and lower bounded activation threshold values. When this happens, it could be said that a graph of the accelerometer readings for this type of activity does not proceed in a straight line between the maximum and minimum threshold values, but instead it momentarily reverses direction and causes a "jag" in the graph.

The Cast-On SLA uses the concept that if accelerometer readings proceed through a series of checkpoints including the associated maximum and minimum activation threshold values of those checkpoints; and the accelerometer readings proceed in-between these maximum and minimum activation threshold values with no reverses in direction (i.e. in a "straight line") then the detected motion is most likely an IAS (i.e. Cast-On). If the accelerometer readings reverse direction in-between the maximum and minimum activation values of the checkpoints (i.e. not a "straight line") then the user is most likely performing some activity other than Casting the device.

A correctly performed Casting motion will likely result in maximum and minimum activation threshold values being crossed multiple times. The Cast-On SLA can be configured to accept changes in direction in the accelerometer readings in-between some, or all of the maximum and minimum activation thresholds used by the algorithm.

A 3 MA at 20 ms intervals of the yaw axis may be used to determine the checkpoints for the casting motion and the associated maximum and minimum activation threshold values. However, other numbers and intervals of samples for calculating MA's could be used. Likewise, the pitch or roll axes, or other axes, may be used to measure the casting motion. Yaw was picked for the preferred embodiment as this is the most like a casting motion. However, the measurement may be of any flicking motion along any axis.

Nine key positions have been identified in a Casting motion. FIGS. 13A-13I describe each of these key positions of the handgun with attached device during a cast, while the letters of each figure are indicated on a graph (FIG. 13) that has the corresponding 3 MA values from the accelerometer readings at each point. In FIGS. 13A-13I, the green and red arrows represent the magnitude and direction of the acceleration (vectors) measured along the yaw and pitch axes respectively. The colors used to represent the vectors in FIGS. 13A-13I were chosen to match the colors of the graphs representing 3 MA values of the yaw and pitch shown in FIG. 13. Even though pitch values are not used in the Cast-On SLA, they were included in FIGS. 13A-13I to help define the movement of the accelerometer. The black arrows in FIGS. 13A-13I indicate the movement of the gun and attached device.

The positions of the gun with attached device (FIGS. 13A-13I) were determined in relation to the graph of the acceleration (FIG. 13) based on critical points on the graph where it was easiest to determine the motion of the gun with attached device regardless of the orientation or velocity of the gun/device. All of the extremes on the graphs (the maximums and minimums of acceleration) in FIG. 13 happen either right after movement of the gun/device in one direction begins, or just after the gun/device begins to slow down, or when both happen at virtually the same time (i.e. when there is a change in direction). These maximum and minimum points occur at C, E, and H in FIG. 13.

Figure 13:
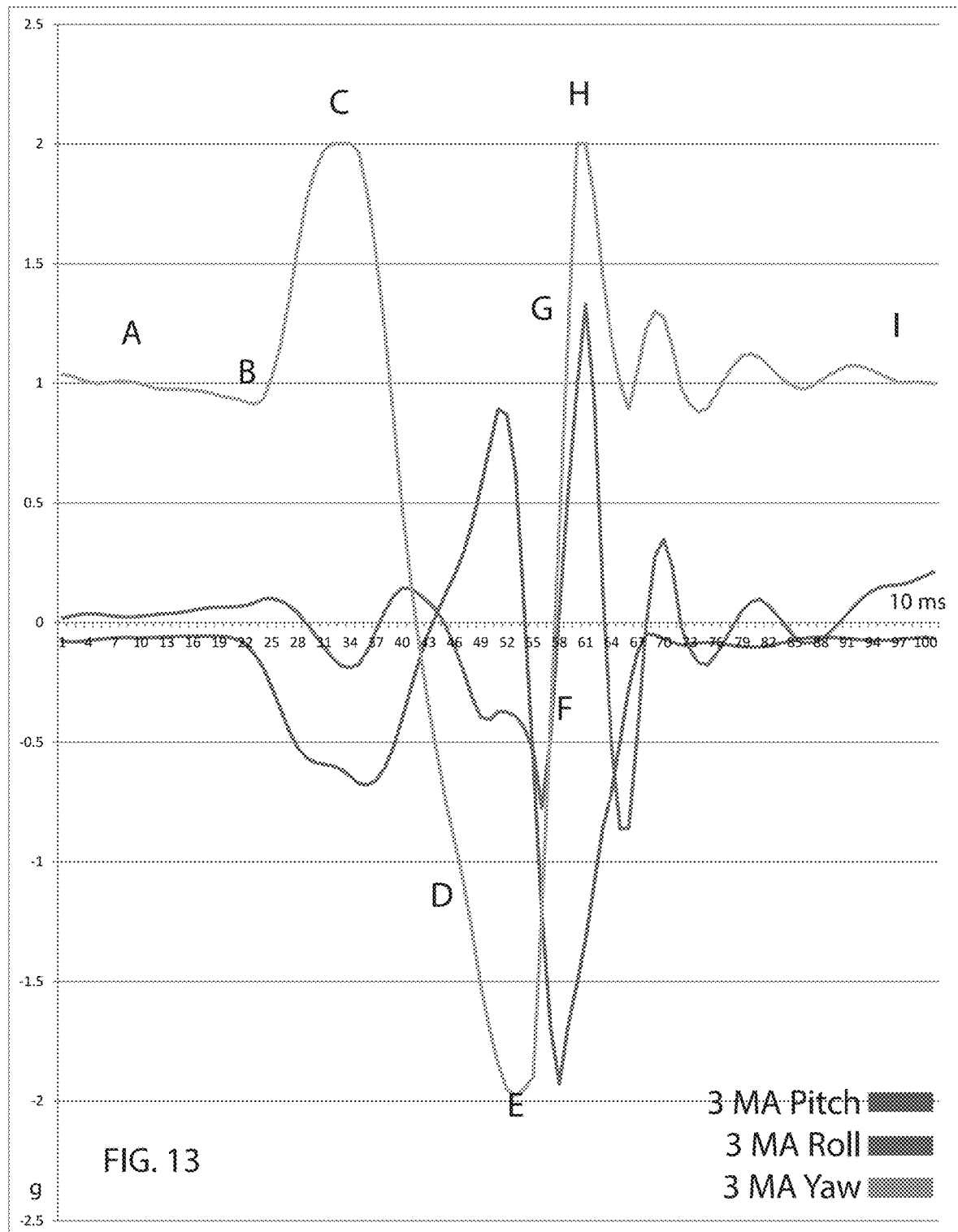
FIG. 13 is a graph depicting the Cast-On method and its threshold targets.

It is not always possible to exactly correlate the graph in FIG. 13 to the motion of the Cast because the motion of the Cast happens quickly, and because the contribution to the measured acceleration values of the static acceleration due to gravity changes based on the angle of the gun/device as the gun/device moves through the Cast motion. So, a best estimate was made and in general the gun/device changes directions just before the MA of the accelerometer measurement changes directions in FIG. 13.

Figure 13A:
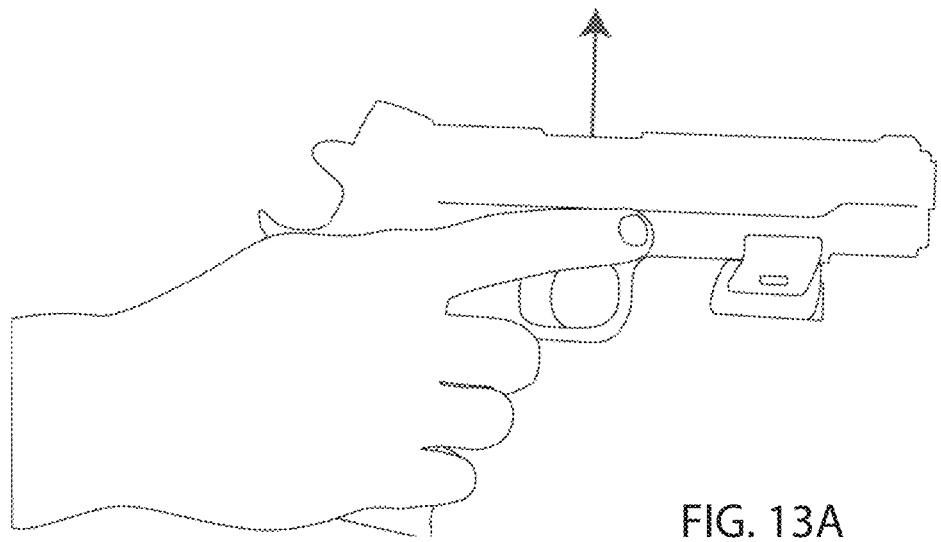
FIG. 13A is a schematic depicting the motion of a "Cast-On" motion of a gun at point A in FIG. 13.
Figure 13B:
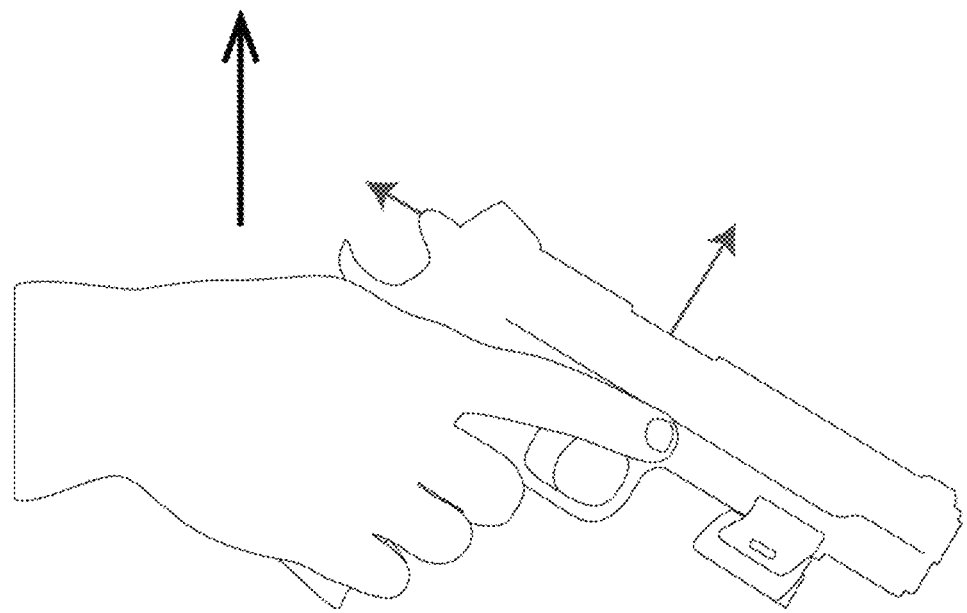
FIG. 13B is a schematic depicting the motion of a "Cast-On" motion of a gun at point B in FIG. 13.
Figure 13C:
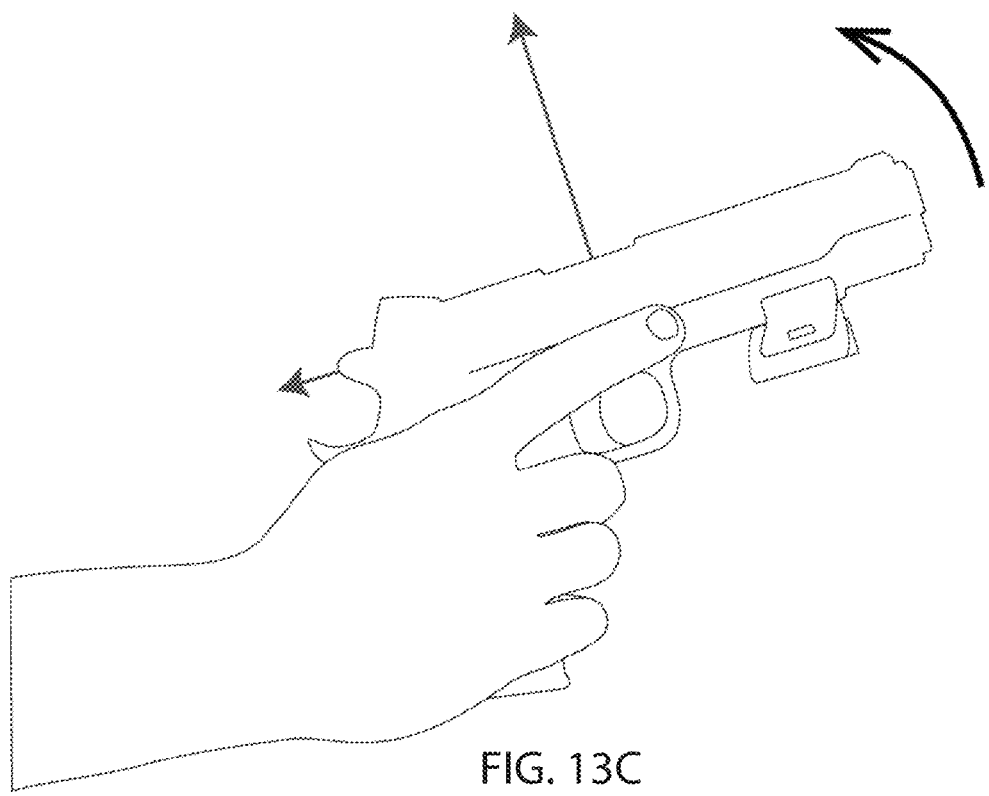
FIG. 13C is a schematic depicting the motion of a "Cast-On" motion of a gun at point C in FIG. 13.

Looking at the graph of the MA of the accelerometer readings for the yaw axis in FIG. 13 several key points can be noted which help in understanding the checkpoints of the Cast-On algorithm. The gun/device begins stationary as shown in FIG. 13A (which corresponds to point A on FIG. 13). Here the yaw axis values average about 1 g due to the static acceleration of gravity (represented by the upward pointing green vector in FIG. 13A). As the Cast motion begins (FIG. 13B) the wrist is pulled up and movement begins to be registered in the graph (point B, FIG. 13), including some acceleration in the pitch axis values as the gun/device is slightly pulled back (red arrow in FIG. 13B). After reaching a bottom limit of motion, the gun/device then begins to rotate upward (FIG. 13C) and the acceleration on the yaw axis increases until it ultimately reaches a maximum acceleration (point C, FIG. 13). A yaw axis value of 1 g is used as the first checkpoint. In FIG. 13, when the yaw axis value crosses the 1 g threshold from point B to point C, the Cast-On SLA begins.

Figure 13D:
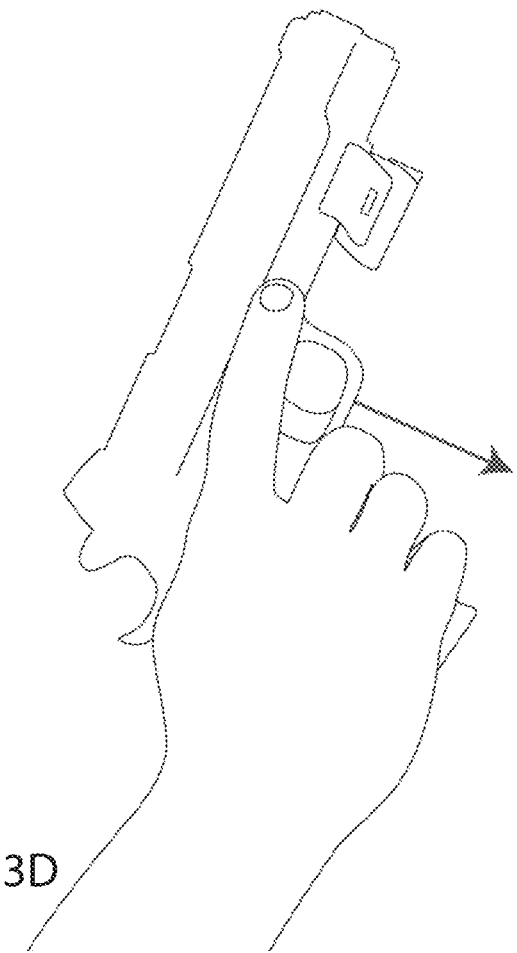
FIG. 13D is a schematic depicting the motion of a "Cast-On" motion of a gun at point D in FIG. 13.
Figure 13E:
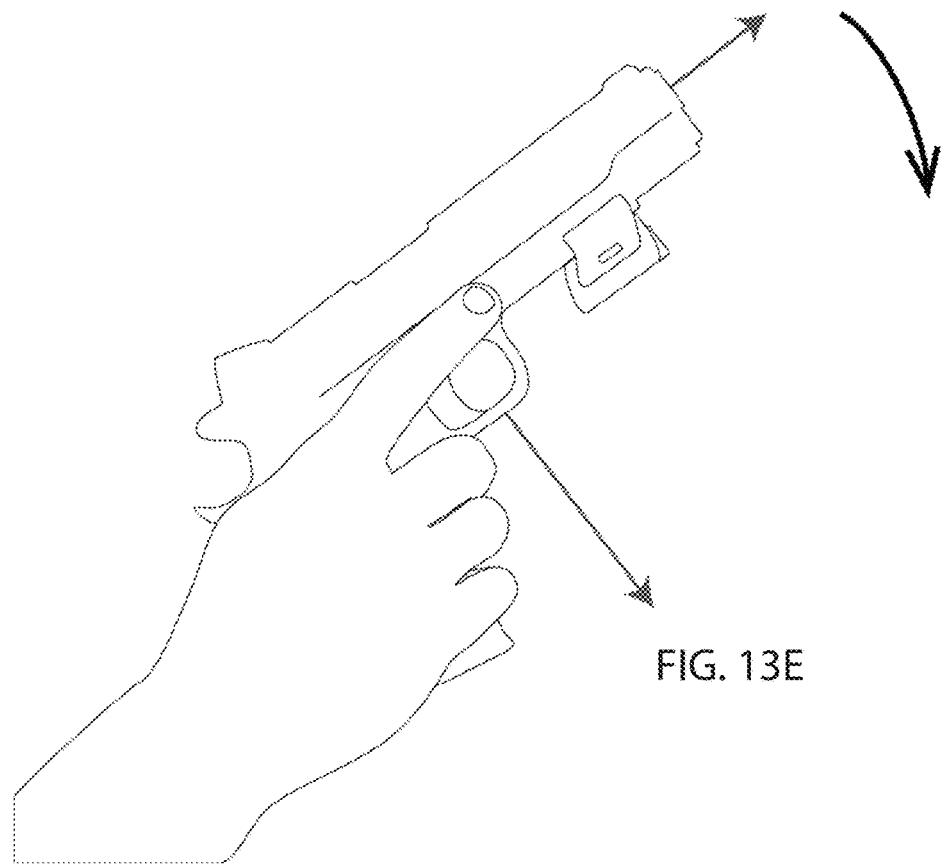
FIG. 13E is a schematic depicting the motion of a "Cast-On" motion of a gun at point E in FIG. 13.

As the gun/laser reaches its highest point of motion (FIG. 13D) it decelerates, and reverses direction as the user begins the flick of the gun/device back through the downward part of the Casting motion. In FIG. 13E the user continues the downward motion of the wrist flick. The deceleration and the beginning of the direction reversal of the gun/laser depicted in FIG. 13D, combined with the downward motion of FIG. 13E causes the yaw axis values to rebound from a maximum and are driven negative (i.e. from point C to point D in FIG. 13). The 2nd checkpoint of the Cast-On SLA is reached when the yaw axis value again crosses 1 g on its way from a maximum (point C in FIG. 13) to a minimum (point E. in FIG. 13). The 3rd checkpoint of the Cast-On SLA is reached when the yaw axis value crosses the −1 g threshold on its way from point C to points D/E in FIG. 13. As the yaw axis value moves from the 1 g threshold of the 2nd checkpoint to the −1 g threshold of the 3rd checkpoint, it must move continuously between these two checkpoints without registering a reversal in direction of the MA of the accelerometer readings (i.e. it must proceed in a "straight line" between 1 g and −1 g as it moves from point C to point E in FIG. 13).

Figure 13F:
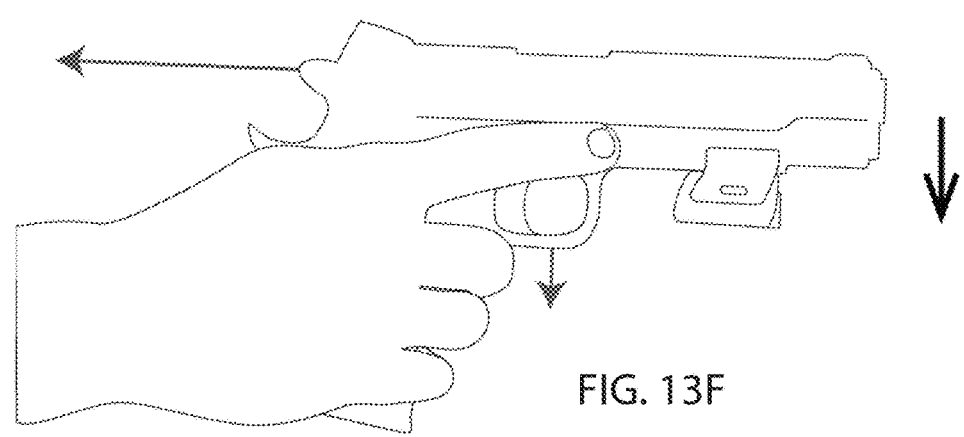
FIG. 13F is a schematic depicting the motion of a "Cast-On" motion of a gun at point F in FIG. 13.
Figure 13G:
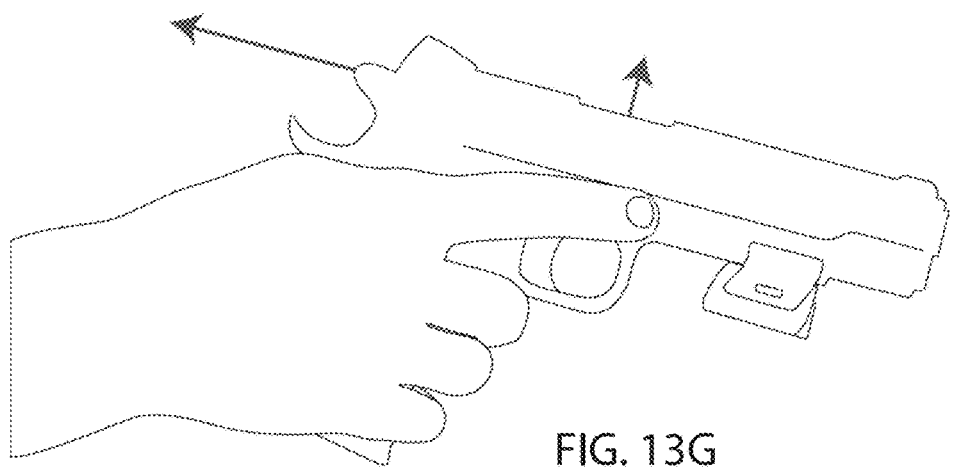
FIG. 13G is a schematic depicting the motion of a "Cast-On" motion of a gun at point G in FIG. 13.
Figure 13H:
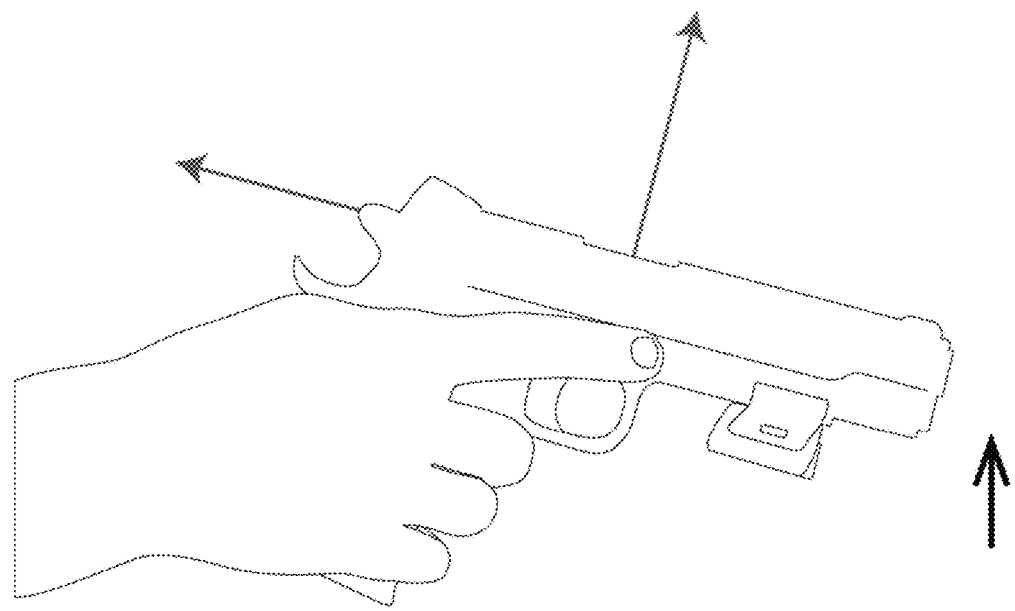
FIG. 13H is a schematic depicting the motion of a "Cast-On" motion of a gun at point H in FIG. 13.
Figure 13I:
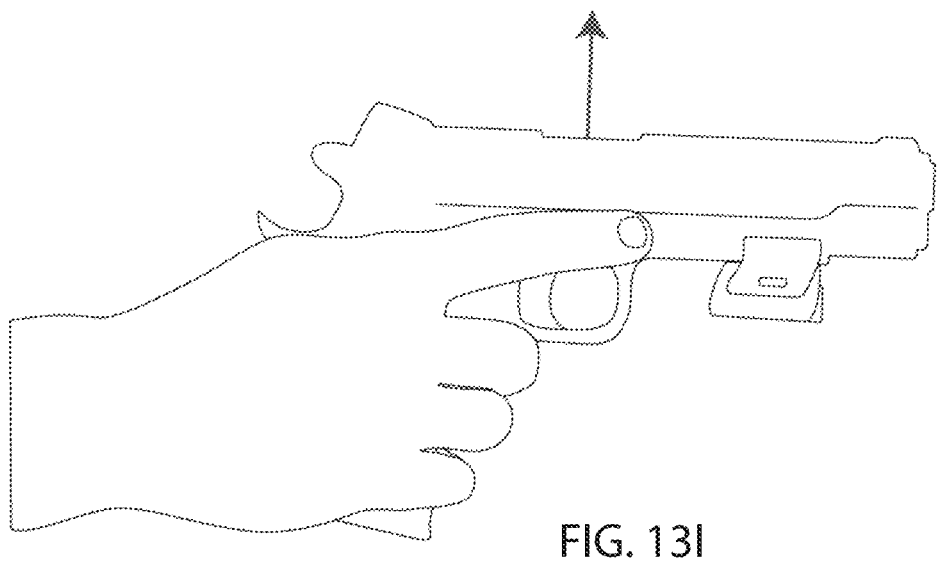
FIG. 13I is a schematic depicting the motion of a "Cast-On" motion of a gun at point I in FIG. 13.

FIG. 13F depicts the gun/laser continuing in its downward motion. As this downward motion continues, the yaw axis values reach a minimum (point E, FIG. 13) and then rebounds back up crossing point F in FIG. 13. Point F in FIG. 13 approximately corresponds to the continued downward motion of the gun/device depicted in FIG. 13F. As the gun/device reaches its lowest point of motion during this segment of the Cast, it decelerates and reverses direction (FIG. 13G). FIG. 13H depicts the user adjusting the gun/ device for the follow through until it finally comes to a rest at the horizontal position depicted in FIG. 13I which is the end of the Casting motion.

As the yaw axis value rebounds at point E in FIG. 13 and begins moving back up toward points G and H, it crosses the 4th checkpoint threshold value of −1 g. The 5th checkpoint threshold value is at 1.2 g as the yaw axis values move from E to G/H in FIG. 13. As the yaw axis value moves from the −1 g threshold of the 4th checkpoint to the 1.2 g threshold of the 5th checkpoint, it must move continuously between these two checkpoints without registering a reversal in direction of the MA of the accelerometer readings (i.e. it must proceed in a "straight line" between −1.5 g and 1.5 g as it moves from point E to points G/H in FIG. 13).

Figure 14:
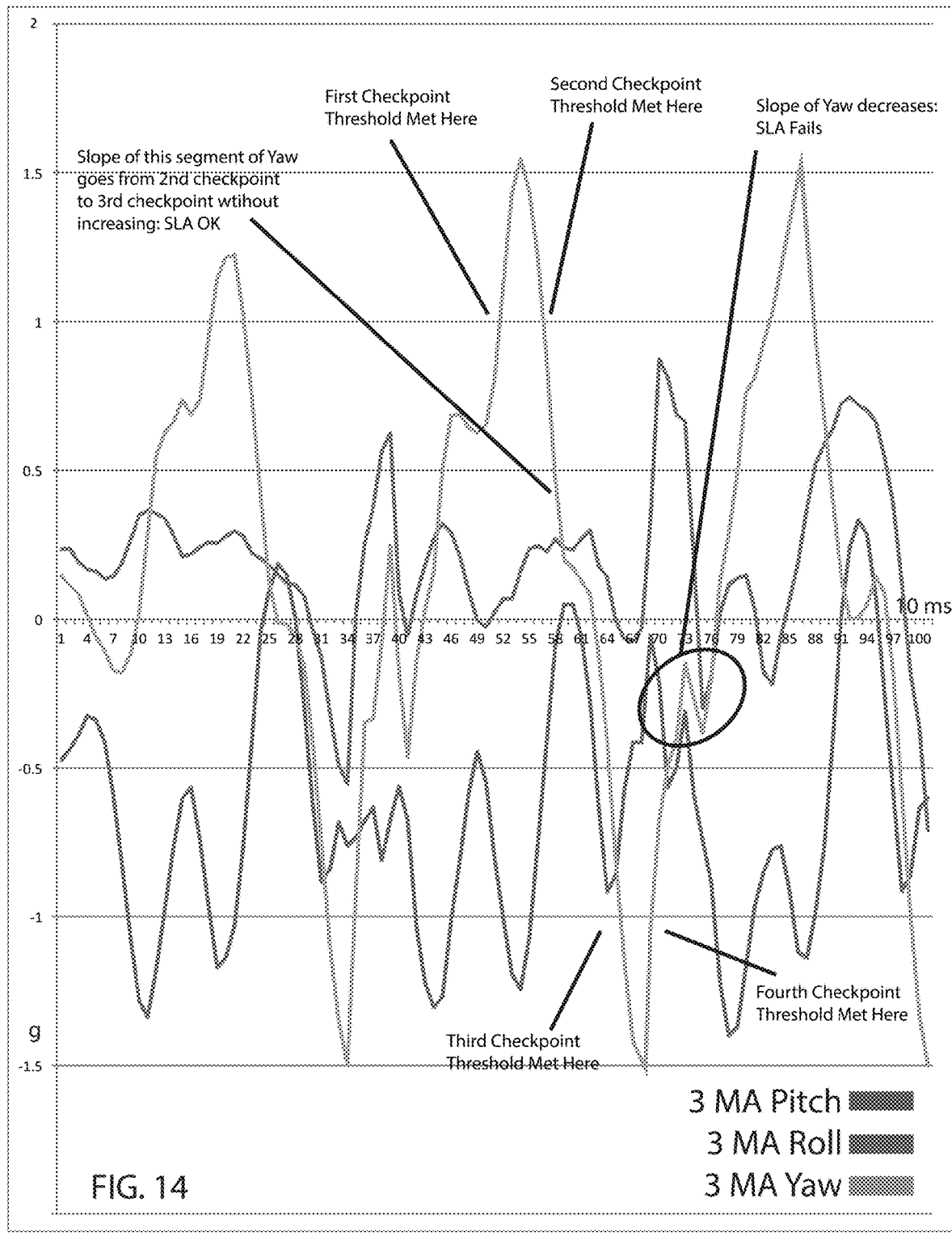
FIG. 14 is a graph depicting a failed Cast-On test.

If the yaw axis accelerometer readings pass through the checkpoints, and the associated threshold values are met; and if the accelerometer readings do not reverse direction between the specified checkpoints, then the conditions of the SLA are met and the switch on the device is activated. If the conditions of the SLA are not met, then the SLA resets and begins looking for the conditions of checkpoint 1 again. This is shown in FIG. 14 where the yaw measurement fails in what would be between checkpoints E and H. Note that a minor change in acceleration does not fail the algorithm as the acceleration has not reversed in direction, just changed in magnitude.

It is important to note that points C, E, and H in FIG. 13 represent actual points on the graph and their respective images (FIGS. 13C, 13E, and 13H) are approximations. Meanwhile, FIGS. 13D and 13G represent actual physical positions during the Casting motion and their respective points on the graph (FIG. 13, points D and G) are approximations. Finally, FIGS. 13A and 13I almost exactly correspond to their points on the graph (FIG. 13 points A and I). FIG. 13F is mostly a filler image to add continuity and understanding to the motion. Also, the motion of the gun represented in FIGS. 13A-13I has been exaggerated to help illustrate what a Casting motion looks like.

The number of samples used to calculate the MA, the interval length between samples, the number of checkpoints used, their location, and the associated threshold values of those checkpoints were found to be effective in the preferred embodiment. However, different numbers of samples could be used to calculate the MA, different interval lengths could be used between samples, more or fewer checkpoints could be used, the location of those checkpoints could be shifted, and their accompanying threshold values could be higher or lower. Additionally, the number of checkpoints used, their location, and/or their associated threshold values could be configurable by the user. When the number of checkpoints is increased, and/or if higher threshold values are used, there may likely be more force required for the Casting motion to activate the device. However, more checkpoints and/or the higher threshold values may also likely reduce UAS's.

Furthermore, in the preferred embodiment 2 "straight line segments" were used. However, any number of straight line segments could also be used, or the SLA may even be abandoned and the Cast-on algorithm may rely entirely on sequential meeting of the checkpoints. Additionally, the number of "straight line segments" used could be configurable by the user, as described with the Angle-on method above. When more "straight line segments" are used, UAS's will likely be reduced but it will take a smoother Casting motion from the user to activate the device.

The Cast-On SLA may be configurable to detect relatively high levels of UAS's and automatically adjust the parameters of the Cast-On SLA to reduce the number of UAS's. For example, if the SLA detects a high number UAS's, it would "learn" that the device may be carried in a holster worn on the users' ankle, and therefore make the activation criteria more stringent by adding more checkpoints, shifting checkpoint locations, increasing threshold activation values, and/or increasing the number of "straight line segments" required before activating the device. Alternatively, the device could detect if there is motion, but relatively few UAS's, then the device could automatically relax the parameters thus making Intended Activations more responsive. Finally, the device could continue adjusting the parameters until an optimum balance between UAS's and device responsiveness to IAS's is reached.

Combining Methods to Activate Multiple Accessories on the Device

The device may have multiple accessories. For example, the device could be a combination laser sight and tactical flashlight attached to a handgun. Angle-On Mode and Cast-On Mode may be combined in various ways to activate multiple accessories. For example, the device could be configured such that Angle-On Mode could be used to activate the laser sight. When the laser sight is activated, the device could begin attempting to detect a Casting motion, which when detected, could then activate a tactical flashlight. Alternatively, the algorithm could be configured such that a Casting motion activates the laser sight, and a subsequent Casting activates a tactical flashlight. An even different alternative is either Angle-On Mode or Cast-On Mode could be used to activate a laser sight, and roll rotation to the right or left could activate a tactical flashlight. These are just some of the possible combinations that could be used to activate multiple accessories on the device. Other combinations of the activation algorithm methods may also be used, including combinations configurable by the user.

Deactivation Algorithm

Possible methods for deactivating the device once it has been activated are for the algorithm to simply check when the conditions for activation are no longer met in the case of Angle-On Mode, and check for an additional Cast (i.e. a "Cast-Off") in the case of Cast-On Mode. However, these approaches can be problematic.

Deactivation Algorithm—Angle-Off

In the case of Angle-On mode, the activation pitch angle θ is −14.5° below horizontal. As discussed earlier, this angle was chosen because it was shallow enough that sitting reclined in a chair with the device holstered typically would not result in an UAS. However, once the device is activated, having it deactivate at a pitch angle of −14.5° would mean the user could not point it at something on the ground without deactivating the device. So to deactivate the device (i.e. "Angle-Off"), a lower pitch deactivation angle is chosen. The inventors chose an angle of −58.2° from horizontal which approximately corresponds to an accelerometer reading of −0.85 g. When the device rotates downward past this angle, then the device is deactivated.

In the case of roll rotation, it was deemed acceptable for the thresholds required to deactivate the device be the same as the thresholds required to activate the device. As discussed earlier, in order to activate the device, the roll rotation is required to be in-between the threshold values of −0.75 g and 0.75 g, which correspond to angles σ of −48.6° and 48.6°. To deactivate the device through roll rotation, the user simply rolls the device from a vertical position (FIG. 11) toward a flat position (FIG. 9) past either angles σ of −48.6° or 48.6°.

In the preferred embodiment for Angle-On Mode, to activate the device it is required for both the pitch angle θ to be above its activation threshold and the roll angle σ to be within its activation thresholds. However, for device deactivation only one of these two deactivation parameters must be met (i.e. either the pitch angle θ must be below its deactivation threshold or the roll angle σ must be outside of its activation thresholds). However, the device could be configured to require both deactivation parameters to be met to deactivate the device.

The thresholds used to deactivate the device for pitch angle and roll rotation were found to be effective in the preferred embodiment. However, other thresholds could be used including thresholds configurable by the user.

In the case of Cast-On Mode, the device could be configured such that once it is activated through a Cast, a 2nd Cast could deactivate the device. However, the problem with this "Cast-Off" approach is that, to the algorithm the characteristic pattern of accelerometer data from a gunshot is virtually indistinguishable from a wrist flick. The problem this causes could be illustrated by the example of target practice by the user with the device activating a laser, with device (and laser) attached to a gun. The user could Cast-On the laser, but the 1st gunshot would have a similar accelerometer pattern as a Cast, and the laser would deactivate. The 2nd gunshot would reactivate the laser and the 3rd gunshot would deactivate the laser and so on. Because of this problem, it was found that once the device was activated in Cast-On Mode, the most effective way to deactivate it is to use the Angle-Off conditions. Essentially, in Cast-On Mode, once the device is activated, then the algorithm checks for the Angle-Off conditions to deactivate the device. However, even though the preferred embodiment uses Cast-On/Angle-Off, other embodiments could use Cast-On/Cast-Off with the understanding by the user that a gunshot may also cause the device to deactivate.

A key objective of the overall algorithm controlling the device is to switch the device off, and keep it off when the user intends for it to be off; and to switch the device on, and keep it on when the user intends for it to be on. Furthermore, the user will likely expect the device to be responsive to activation and deactivation signals.

Angle-On Mode and Cast-On Mode are powerful algorithms developed to maximize the responsiveness of the device to IAS's while minimizing UAS's. In general, the characteristics of these algorithms are such that increased threshold values may result in fewer Unintended Activation Signals (UAS's), but may also make the device less responsive to Intended Activation Signals (IAS's). It may be beneficial to use lower threshold values to activate the device to make the device more responsive. This may increase UAS's. However, the Angle-Off Mode contains a built-in advantage that helps to mitigate the effects of UAS's. Typically, UAS's would happen when the device is holstered (i.e. the device is pointing down). The UAS's would be caused by some activity of the user momentarily causing the device to reach its activation threshold values. However, since the device is pointing down in the holster, the next few accelerometer readings will indicate the Angle-Off conditions are met and the device will deactivate. In other words, if the device accidentally activates when holstered, it will almost immediately deactivate since the device is pointing down. If the device were controlling a laser, it could be said that any UAS's would cause the laser to "flash" on for a brief moment before it turns back off. Furthermore, even if the device does momentarily activate, it is holstered so it is likely that the user would not notice the momentary activation.

If the number of UAS's are relatively high, even though the device is only momentarily activated on each one, these momentary activations could add up over time to become a significant drain on the battery. Therefore, activation threshold values that result in a relatively high number of UAS's should be avoided. However, a relatively few number of UAS's will likely only result in a minor drain on the battery. The benefits of increased responsiveness of the device to IAS's will likely outweigh the consequences of relatively few UAS's (i.e. a little bit of battery drain and a momentary device activation that is probably not noticed by the user), therefore activation thresholds should be selected accordingly.

Deactivation Algorithm—Deactivation Integral Counter

While a few UAS's will probably not be noticed by the user, if the device is subject to Unintended Deactivation Signals (UDS's) when it is activated, this would likely be very noticeable to the user. Using the Angle-Off conditions as the only conditions required to deactivate the laser may cause UDS's in the case of device movement while activated. For example, if the device were controlling a laser attached to a gun, in Angle-On Mode if the user had the gun drawn the user would expect the laser to be on. However, with Angle-Off as the only deactivation conditions, if the user were to start shaking the gun while it is drawn, this would likely result in accelerometer readings that met the Angle-Off conditions and the laser would begin to "flash" off and on during the shaking.

While it is unlikely most users are going to be shaking the device if it is attached to a gun, it is possible that if the user were running with the gun drawn, this motion may also result in UDS's. Additionally, shooting the gun while drawn would also likely result in UDS's. A user using the device controlling a laser attached to a gun at target practice may be especially disconcerted if the laser "flashed" off with every gunshot.

The consequences of UDS's are potentially graver than the consequences of UAS's. Therefore, while a relatively few UAS's can be tolerated, virtually no UDS's can be tolerated. One method of minimizing UDS's is to introduce a timer as an additional deactivation signal. When the Angle-Off conditions are met, a timer is set such that a certain amount of time passes before the device deactivates. For example, a 2 second timer could be set so that when the Angle-Off conditions are met, the timer keeps the device activated for 2 more seconds, and if the Angle-On conditions are met at the end of those 2 seconds, keep the device activated. The idea of the timer is that whatever activity is causing the UDS's, hopefully after 2 seconds that activity is stopped and the device will appear to stay activated without interruption. However, there are three problems with the timer approach. The first problem is if the activity resulting in the UDS's lasts for more than 2 seconds, then the device would have Unintended Deactivations (UD's) after the 2 second timer expired. The second problem is with the user experience. If the user gives an Intended Deactivation Signal (IDS), any latency in actually deactivating the device is likely to be disconcerting to the user. The third problem is if there are a high number of UAS's, with the 2 second timer it would keep the device activated for 2 seconds for every UAS instead of the device "flashing" on for each UAS. This problem may cause a significant drain on the battery.

To mitigate the problems associated with UDS's, a Deactivation Integral Counter (DIC) was developed as an additional deactivation condition to the Angle-Off conditions. The DIC is very powerful in virtually eliminating UDS's, while maintaining maximum responsiveness to IDS's. The DIC is similar to the Activation Integral Counter (AIC) in that the DIC acts as a counter that must add up to a certain threshold value. It is further similar to the AIC in that if accelerometer values of a certain axis cross 0 g, then the DIC for that axis is set to 0 s·g (i.e. the DIC for that axis is "cleared"). However, the DIC is different than the AIC in that the AIC is used to activate the device when it is in a deactivated state, but the DIC is used to deactivate the device off when it is active. In other words, the AIC is used to as a condition to switch the device on, and the DIC is used as a condition to switch the device off. Furthermore, in the preferred embodiment the AIC is only acting on the yaw axis, but the DIC does not act on the yaw axis and instead acts on the pitch and roll axes. In the preferred embodiment, the DIC uses the 3 MA at 20 ms intervals of the pitch and roll axes, however, other MA's could be used.

First, looking at the pitch axis, the DIC-Pitch Axis makes use of the idea that when the device is in a drawn horizontal position, the pitch values average about 0 g (the pitch axis 22 being parallel to the ground), but when the device is holstered (the pitch axis 22 being perpendicular to the ground) the pitch values average about −1 g. When the pitch value goes below 0 g the DIC-Pitch Axis begins incrementing in a similar way to the AIC, where every 20 MS, it checks the pitch value, multiplies it by 20 MS (0.02 seconds), and adds the result to the current value of the DIC-Pitch Axis. It could be said that the DIC-Pitch Axis is a running tally of the area between the red pitch axis line and the 0 g line in FIG. 8. When the device is holstered (i.e. vertical pointing down) the DIC-Pitch Axis begins to rapidly increment. If the DIC-Pitch Axis reaches a threshold value of −0.09 si, the device is most likely holstered, therefore deactivate the device. If the activated device is shaking due to user movement, or due to gunshots, then the accelerometer values for pitch will cross the 0 g line multiple times, and each time the accelerometer pitch values cross 0 g from negative to positive, the DIC-Pitch Axis is set to 0 s·g (i.e. "cleared") and stays 0 s·g until the accelerometer pitch values go negative again. Therefore, shaking or gunshots will likely cause the DIC-Pitch Axis to clear often, and as long as there is shaking or gunshots, the DIC-Pitch Axis will likely never add to the −0.09 s·g deactivation threshold thus keeping the device activated. However, when the shaking or gunshots stop, and the device is holstered, the DIC-Pitch Axis will quickly reach the −0.09 s·g threshold allowing the device to deactivate.

The same concept is used for the roll axis. It could be said that the DIC-Roll Axis is a running tally of the area between the blue roll axis line and the 0 g line in FIG. 8. If the device is drawn, then the roll axis 24 averages about 0 g. However, if the device is laid on its side then the roll axis goes to either 1 g, or −1 g depending on which side the device is laid. As was discussed earlier, if the device is laid on its side then it is most likely not in use and therefore should be deactivated. If the roll axis values cross 0 g on the positive side, then the DIC-Roll Axis will need to increment to a threshold value of 0.09 s·g to deactivate the device. If the roll axis values cross 0 g on the negative side, then the DIC-Roll Axis will need to increment to a threshold value of −0.09 s·g to deactivate the device. Any 0 g line crossings of the roll axis values will set the DIC-Roll Axis to 0 (i.e. it will be "cleared"). If the device is in rapid movement (i.e. shaking or gunshots) then the DIC-Roll Axis will likely be cleared often and will not reach the threshold required for deactivation. However, when the rapid movement of the device stops and it is laid on its side, then the DIC-Roll Axis will quickly reach the deactivation threshold allowing the device to be deactivated.

The device will typically only be rotated in one direction to deactivate it. For example, the device will either be holstered (pitch axis goes to −1 g) or it will be laid on its side (roll axis goes to −1 g, or 1 g) but it is unlikely both will happen simultaneously. Therefore, only one of either the DIC-Pitch Axis or DIC-Roll Axis needs to reach its deactivation threshold to deactivate the device.

In the preferred embodiment, a deactivation threshold value of −0.09 s·g was used for the DIC-Pitch Axis and deactivation threshold values of −0.09 s·g and 0.09 s·g were used for the DIC-Roll Axis. However, other deactivation threshold values could be used including values configurable by the user. Additionally, in the preferred embodiment the pitch axis crossing 0 g clears the DIC-Pitch Axis and the roll axis crossing 0 g clears the AIC-Roll Axis. However, other axes could be used to clear the DIC's. For example, the yaw axis crossing 0 g could be used as a signal to clear the DIC-Roll Axis, etc.

Below is a summary of the Preferred Deactivation Algorithm:

Angle-Off—Check if the 3 MA of the pitch is below −58.2° (relative to horizontal)

Angle-Off—Check if the 3 MA of the roll axis is either below −48.6° or above 48.6° (but not in-between these two values)

Deactivation Integral Counter—Check if the DIC-Pitch Axis value is −0.09 s·g or lower Deactivation Integral Counter—Check if the DIC-Roll Axis value is 0.09 s·g or greater if the roll axis value is positive, or −0.09 s·g or lower if the roll axis value is negative If either of the Angle-Off conditions and either of the DIC conditions are met, then deactivate the device.

Deactivating Multiple Accessories

It was earlier discussed that multiple accessories to the device could be activated by a combination of activations signals. Similarly, multiple accessories to the device could be deactivated by a combination of deactivation signals. For example, a device with both a laser sight and a tactical flashlight could have the tactical flashlight deactivated when the device rolled to the left and could have the laser sight deactivated when the device rolled to the right and holstering the device could deactivate both. Or, the tactical flashlight could be deactivated by a Cast, and the laser sight could be deactivated by rolling the device to the right or to the left. Other combinations of deactivation signals could be used including deactivation signals configurable by the user.

It should be noted that any configuration by the user may be accomplished by means known or later discovered in the art, including using controls on the switch, relying on a separate application on a computer or smartphone. Communication may be hardwired or through a wireless, radiofrequency communication module.

While this invention has been described as a combination of many sub-algorithms, it should be understood that each individual sub-algorithm may be used on its own or in combination with less than all of the presented sub-algorithms as a control methodology for a motion-controlled switch. It has been found by the inventors that the combination of all of the sub-algorithms has particular usefulness.

Although the present invention has been described with reference to the preferred embodiments, numbers modifications and variations can be made and still the result will come within the scope of the invention. No limitation with respect to the specific embodiments disclosed herein is intended or should be inferred. It should be noted that the figures and detailed description are based on a particular use of the invention with a laser sight for a firearm. This description should not be seen as limiting as the invention also contemplates other uses, though angles and tolerances may need to be adjusted for these uses. The invention has a particular use when a controlled object is carried by a human or animal as it is efficient in eliminating unintended activation due to body motion and the description and, where relevant, the claims should be read as such.

We claim:

1. A method for controlling a switch, said switch controlling electrical power transmitted to a load and comprising a processor, timer, and at least one axial accelerometer measuring accelerations along an individual axis, the method comprising:
   a. setting at least one time interval condition and taking measurements of accelerations along at least one axis every time interval;
   b. setting a number of measurements to be averaged into an average acceleration value;
   c. repeating acceleration measurements at every time interval, and averaging only the most recent acceleration measurements to obtain new average acceleration values;
   d. setting an activation counter threshold condition;
   e. if the activation counter threshold condition is met by an average acceleration value, incrementing an activation counter and continually adding to the activation counter in the same manner for each subsequent average acceleration value that meets the activation counter threshold condition;
   f. if subsequent average accelerations do not meet the activation counter threshold condition, then reducing the activation counter; and
   g. only activating the switch if an activation counter threshold value is reached.

2. The method of claim 1, the activation counter being incremented by multiplying the average acceleration value by the time increment and accumulating the product of the same in the activation counter.

3. The method of claim 1, the step of reducing the activation counter being a total clearing of the counter to zero.

4. The method of claim 1, further comprising:
   h. comparing each average acceleration value to a second threshold condition; and
   i. only activating the switch if the counter threshold value is reached and the second threshold condition is met.

5. The method of claim 4, the axis being used for the second threshold condition being a different axis than the axis used to determine the activation counter.

6. The method of claim 4, one accelerometer measuring along a pitch axis of the switch, one accelerometer measuring along a yaw axis of the switch and one accelerometer measuring along a roll axis of the switch.

7. The method of claim 1, the method further comprising a step of setting a secondary activation counter threshold condition for acceleration measurements along a second axis and reducing the activation counter if this secondary activation counter threshold condition is met irrespective of whether the activation counter threshold condition is also met.

8. The method of claim 1, further comprising a deactivation counter keyed to accelerations along at least one deactivation axis.

9. The method of claim 8, the deactivation counter further comprising:
   h. taking measurements of deactivation accelerations along the at least one deactivation axis every time interval;
   i. setting a number of measurements to be averaged into an average deactivation acceleration value;
   j. repeating deactivation acceleration measurements at every time interval, and averaging only the most recent deactivation acceleration measurements to obtain new average deactivation acceleration values;
   k. if a deactivation threshold condition is met by an average deactivation acceleration value, incrementing a deactivation counter and continually adding to the deactivation counter in the same manner for each subsequent average deactivation acceleration value that meets the deactivation threshold condition;
   l. if subsequent average deactivation accelerations do not meet the deactivation threshold condition, then reducing the deactivation counter; and
   m. deactivating the switch if the deactivation counter reaches a deactivation counter threshold.

10. The method of claim 9, the deactivation counter being incremented by multiplying the average acceleration value along the at least one deactivation axis by the time increment and accumulating the product of the same in the deactivation counter.

11. The method of claim 9, the step of reducing the deactivation counter being a total clearing of the deactivation counter to zero.

12. The method of claim 9, further comprising:
   n. comparing each average deactivation acceleration value to a second, moving average, deactivation threshold condition; and
   o. only deactivating the switch if the deactivation threshold condition and the deactivation counter threshold value is reached.

13. The method of claim 12, the axis being used for the deactivation threshold condition being a different axis than the axis used to determine the deactivation counter.

14. The method of claim 9, the method further comprising a step of setting a secondary deactivation counter threshold condition for acceleration measurements along an axis different than the at least one deactivation axis and reducing the deactivation counter if this secondary deactivation counter threshold condition is met irrespective of whether the deactivation counter threshold condition is also met.

15. The method of claim 1, the number of measurements to be averaged into the average acceleration value being set at 1.

16. A method for controlling a switch through a set deactivation condition, said switch controlling electrical power transmitted to a load and comprising a processor, timer, and at least one axial accelerometers measuring accelerations along an individual axis, the method comprising:
   a. taking measurements of deactivation accelerations along at least one axis every time interval;
   b. setting a number of measurements to be averaged into an average deactivation acceleration value;
   c. repeating deactivation acceleration measurements at every time interval, and averaging only the most recent deactivation acceleration measurements to obtain new average deactivation acceleration values;
   d. if a deactivation threshold condition is met by an average deactivation acceleration value, incrementing a deactivation counter and continually adding to the deactivation counter in the same manner for each subsequent average deactivation acceleration value that meets the deactivation threshold condition;

e. if subsequent average deactivation accelerations do not meet the deactivation threshold condition, then reducing the deactivation counter; and f. deactivating the switch if the deactivation counter reaches a deactivation counter threshold.

17. The method of claim 16, the deactivation counter being incremented by multiplying the average acceleration value along the at least one deactivation axis by the time increment and accumulating the product of the same in the deactivation counter.

18. The method of claim 16, the step of reducing the deactivation counter being a total clearing of the deactivation counter to zero.

19. The method of claim 16, the deactivation condition thereof further comprising:

g. comparing each average deactivation acceleration value to a second, moving average, deactivation threshold condition; and h. only deactivating the switch if the deactivation threshold condition and the deactivation counter threshold value is reached.

20. The method of claim 19, the axis being used for the deactivation threshold condition being a different axis than the axis used to determine the deactivation counter.

21. The method of claim 16, the method further comprising a step of setting a secondary deactivation counter threshold condition for acceleration measurements along an axis different than the at least one deactivation axis and reducing the deactivation counter if this secondary deactivation counter threshold condition is met irrespective of whether the deactivation counter threshold condition is also met.

22. The method of claim 16, the number of measurements to be averaged into the average acceleration value being set at 1.

23. A method for controlling a switch, said switch controlling electrical power transmitted to a load and comprising a processor, timer, and at least one axial accelerometer measuring accelerations along an individual axis, the method comprising:

a. setting at least one time interval condition and taking measurements of accelerations along at least one axis every time interval;

b. comparing the measurements of accelerations to a set of checkpoints stored in memory, said checkpoints defining a characteristic pattern of accelerations and decelerations anticipated by a predetermined action; and c. activating the switch if the measurements of accelerations match the characteristic pattern as would be anticipated by the predetermined motion.

* * * * *